(12) United States Patent
Akasaka

(10) Patent No.: US 7,212,910 B2
(45) Date of Patent: May 1, 2007

(54) CONTROL APPARATUS OF DIRECT INJECTION INTERNAL COMBUSTION ENGINE

(75) Inventor: Nobuhiro Akasaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/354,940

(22) Filed: Feb. 16, 2006

(65) Prior Publication Data

US 2006/0212212 A1  Sep. 21, 2006

(30) Foreign Application Priority Data

Mar. 17, 2005  (JP) .............................. 2005-077809

(51) Int. Cl.
*F02D 41/04* (2006.01)
*F02D 29/02* (2006.01)

(52) U.S. Cl. ..................................... 701/112

(58) Field of Classification Search ................ 701/112, 701/102, 101, 103, 105; 123/295, 298, 198 F, 123/198 D
See application file for complete search history.

(56) References Cited

U.S. PATENT DOCUMENTS 6,474,294 B2 * 11/2002 Yamazaki et al. .......... 123/295

2005/0262831 A1 * 12/2005 Shouda et al. ............... 60/285

FOREIGN PATENT DOCUMENTS

| JP | 8-150858 A | * | 6/1996 |
| JP | A2003-65105 | | 3/2002 |
| JP | A 2003-172188 | | 6/2003 |

* cited by examiner

*Primary Examiner*—Hieu T. Vo
(74) *Attorney, Agent, or Firm*—Crowell & Moring LLP

(57) ABSTRACT

The present invention provides a control apparatus of a direct injection internal combustion engine used in an idling stop vehicle or the like, which can reduce residual fuel generated in a combustion chamber in an engine stop time, and prevent deterioration of exhaust performance and deterioration of exhaust gas performance (A/F control precision) at the time of engine restart. The control apparatus includes an automatic stop control device for automatically stopping an internal combustion engine upon satisfaction of a predetermined automatic stop condition, and at least one of a fuel injection control unit which corrects fuel injection and an air-flow amount control unit which corrects an air-flow amount. Upon satisfaction of the predetermined automatic stop condition, at least one of fuel injection correcting control by the fuel injection control unit and air-flow amount correcting control by the air-flow amount control unit is performed.

12 Claims, 19 Drawing Sheets

CONTROL APPARATUS OF DIRECT INJECTION INTERNAL COMBUSTION ENGINE

BACKGROUND OF THE INVENTION

1. Field of the Invention

The present invention relates to a control apparatus of a direct injection internal combustion engine mounted in a vehicle as one power source, and more particularly to a control apparatus of a direct injection internal combustion engine used when the internal combustion engine is stopped, as in an idling stop time.

2. Description of the Related Arts

In recent years, from a viewpoint of emission reduction and improvement in fuel efficiency, an idling stop vehicle and a hybrid vehicle have been known. The hybrid vehicle, for example, is capable of automatically stopping its engine when in a state in which the efficiency of the engine declines (e.g., when the vehicle is stopped or driving at a low speed) and running solely using the driving force of an electric motor.

Meanwhile, mainly to improve the fuel efficiency, a direct injection internal combustion engine (a direct injection engine) which directly injects fuel into a combustion chamber has been practically used as a spark-ignition engine. The direct injection engine can improve filling efficiency and increase a compression ratio. Therefore, the direct injection engine is expected to perform highly efficient combustion, compared with a port injection engine.

The direct injection engine has an advantage of directly injecting fuel into the combustion chamber. By using the direct injection engine with this advantage, the idling stop vehicle can obtain prompt restart performance and improved precision in torque control when starting the internal combustion engine which is essential for controlling the hybrid vehicle.

As an example of such application of the direct injection engine to the hybrid vehicle, JP, A 2003-065105 (hereinafter referred to as a Patent Document 1), for example, describes a direct injection engine which only injects fuel into a cylinder under a compression stroke upon satisfaction of an engine stop condition, so that the restart performance of the hybrid vehicle upon discontinuation of the idling stop state is improved.

Usually, when the engine is stopped, fuel cut and ignition cut are carried out by an ignition switch-off operation performed by a driver. As a result, fuel adhered to an intake port remains in the combustion chamber or in the intake port in some cases.

In light of the above, JP, A 2003-172188 (hereinafter referred to as a Patent Document 2), for example, describes a port injection engine which, when the engine is stopped by the ignition switch-off operation performed by a driver, advances timing of performing the port injection for prolonging a fuel evaporation time and continuing to perform ignition control, so that as much fuel as possible is combusted to reduce an amount of residual fuel.

SUMMARY OF THE INVENTION

In the idling stop vehicle, the engine is repeatedly started and stopped many times during one trip from switch-on to switch-off of an ignition switch while the engine is kept in a high temperature state. Therefore, if fuel is only injected into the cylinder under the compression stroke upon satisfaction of the engine stop condition, and if residual fuel remains in the combustion chamber during the idling stop state, as described in the Patent Document 1, for example, following phenomena occur: (1) deterioration of exhaust performance due to emission of evaporated residual fuel into the air, (2) deterioration of restart performance due to over-enrichment of fuel by the residual fuel, and (3) deterioration of exhaust gas performance (i.e., A/F control precision) due to instability of the residual fuel.

Meanwhile, in a engine which changes the injection timing at the time of ignition switch-off, such as the engine described in the Patent Document 2, for example, if a fuel injection operation has already been performed on a cylinder or has already been set for the cylinder, a few cycles of the operation are required to completely combust the fuel. Therefore, engine stop may be delayed in response to the ignition switch-off operation performed by a driver. Further, since this type of engine is a port injection engine, the residual fuel adhered to the intake port may not be completely removed.

Meanwhile, the direct injection engine directly injects fuel into the combustion chamber. Thus, the residual fuel remaining in the direct injection engine causes the following phenomena different from the phenomena of the port injection engine: (4) backflow of the injected fuel from the combustion chamber, and (5) direct adhesion of fuel to a cylinder head, a valve, and a wall of the combustion chamber, which causes a much larger amount of adhered fuel compared with the port injection engine.

In light of the above circumstances, it is an object of the present invention to provide a control apparatus of a direct injection internal combustion engine used in the idling stop vehicle or the like, which can reduce the residual fuel generated in the combustion chamber in the engine stop time, and prevent the deterioration of exhaust performance and the deterioration of exhaust gas performance (i.e., A/F control precision) at the time of engine restart.

A control apparatus of a direct injection internal combustion engine according to a first aspect of the present invention includes an automatic stop control device for automatically stopping an internal combustion engine upon satisfaction of a predetermined automatic stop condition. The control apparatus further includes at least one of a fuel injection control unit for correcting fuel injection, and an air-flow amount control unit for correcting an air-flow amount. Upon satisfaction of the predetermined automatic stop condition, at least one of fuel injection correcting control by the fuel injection control unit and air-flow amount correcting control by the air-flow amount control unit is performed.

Preferably, in the control apparatus of a direct injection internal combustion engine according to the first aspect of the present invention, upon satisfaction of the predetermined automatic stop condition, the fuel injection control unit may perform a fuel injection correcting control to delay a fuel injection timing for a predetermined time period, and thereafter the fuel injection control unit may perform a fuel injection control to complete a fuel injection.

Preferably, in the control apparatus of a direct injection internal combustion engine according to the first aspect of the present invention, upon satisfaction of the predetermined automatic stop condition, the fuel injection control unit may perform a fuel injection correcting control to reduce a fuel injection amount for a predetermined time period, and thereafter the fuel injection control unit may perform a fuel injection control to complete a fuel injection.

Preferably, in the control apparatus of a direct injection internal combustion engine according to the first aspect of the present invention, the fuel injection correcting control for reducing the fuel injection amount for the predetermined time period may be performed by increasing pressure in a fuel common rail.

Preferably, in the control apparatus of a direct injection internal combustion engine according to the first aspect of the present invention, during the predetermined time period in which the fuel injection control unit performs the fuel injection correcting control to reduce the fuel injection amount, the air-flow amount control unit may perform a control to reduce an intake air-flow amount.

Preferably, in the control apparatus of a direct injection internal combustion engine according to the first aspect of the present invention, upon satisfaction of the predetermined automatic stop condition, the air-flow amount control unit may perform a control to advance an intake valve closing timing for a predetermined time period.

Preferably, in the control apparatus of a direct injection internal combustion engine according to the first aspect of the present invention, upon satisfaction of the predetermined automatic stop condition, the air-flow amount control unit may perform a control, for a predetermined time period, to stop operation of an air-flow adjusting device which adjusts an air-flow in a cylinder.

Further, a control apparatus of a direct injection internal combustion engine according to a second aspect of the present invention includes an automatic stop control device for automatically stopping an internal combustion engine upon satisfaction of a predetermined automatic stop condition. The control apparatus further includes at least one of: an air-flow amount control unit including an intake air-flow amount adjusting device for controlling to reduce an intake air-flow amount, an engine revolution number control unit for increasing the number of engine revolutions for a predetermined time period at the end of a fuel injection, a fuel pressure control unit for increasing fuel pressure to perform the fuel injection, and a fuel injection control unit for correcting the fuel injection to advance an fuel injection timing. Upon satisfaction of the predetermined automatic stop condition, at least one of a control by the air-flow amount control unit to reduce the intake air-flow amount, a control by the engine revolution number control unit to increase the number of engine revolutions for the predetermined time period at the end of the fuel injection, and a control by the fuel pressure control unit and the fuel injection control unit to increase the fuel pressure for performing the fuel injection and then advance the fuel injection timing, is performed.

Preferably, in the control apparatus of a direct injection internal combustion engine according to either one of the first and second aspects of the present invention, the air-flow amount control unit may include an electrically controlled throttle valve device provided to an intake passage.

Preferably, in the control apparatus of a direct injection internal combustion engine according to either one of the first and second aspects of the present invention, the air-flow amount control unit may include an intake valve opening characteristic adjusting device provided to an intake passage.

According to the control apparatus of a direct injection internal combustion engine of an embodiment of the present invention, in a system such as the idling stop vehicle in which its engine is repeatedly started and stopped more than once during one trip from switch-on to switch-off of the ignition switch, the residual fuel generated in the combustion chamber or the intake port can be reduced in the engine stop time, and the deterioration of exhaust performance due to vapor generated in the idling stop time and the deterioration of exhaust gas performance (i.e., A/F control precision) at the time of engine restart can be prevented.

Further, the over-enrichment of fuel caused by the residual fuel at the time of engine restart can be prevented, and the restart performance and the torque controllability can be improved.

DESCRIPTION OF THE PREFERRED EMBODIMENTS

With reference to the drawings, detailed description will now be made of embodiments of the control apparatus of a direct injection internal combustion engine according to the present invention.

Figure 1:
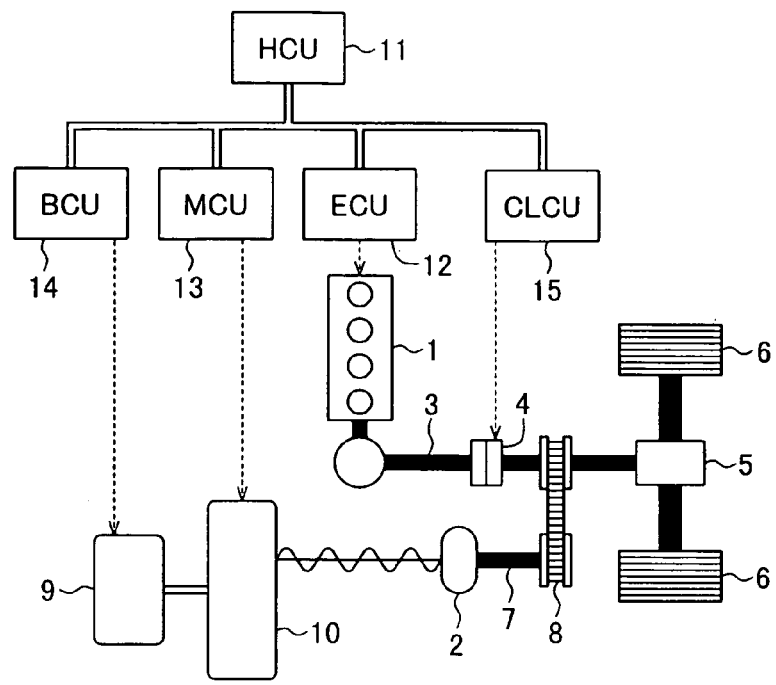
FIG. 1 is a diagram illustrating a system configuration of a hybrid vehicle system which uses a control apparatus of a direct injection engine according to an embodiment of the present invention.

FIG. 1 illustrates one embodiment of a power system and a control system of a vehicle which uses a control apparatus of a direct injection internal combustion engine according to one embodiment of the present invention.

The vehicle illustrated in FIG. 1 is a so-called hybrid vehicle that includes two power sources, i.e., a direct injection engine 1 and a motor generator 2. Power of the direct injection engine 1 is transmitted to wheels 6 though an output shaft (an engine output shaft) 3, a clutch 4, and a differential transmission 5. Meanwhile, power of the motor generator 2 is transmitted to the wheels 6 though an output shaft 7, a power transmitting belt mechanism 8, and the differential transmission 5.

The motor generator 2 uses a battery 9 as a power source. Power supplied by the battery 9 is controlled by an inverter 10. Electrical energy generated by the battery 9 is converted into an alternating current by the inverter 10 and supplied to the motor generator 2. Using the thus generated driving force, the motor generator 2 drives the output shaft 3 and the wheels 6 via the power transmitting belt mechanism 8 when the direct injection engine 1 is started.

The battery 9 is different from a 12-volt battery serving as a power source for an HCU 11 and the like, which are later described. A 200-volt battery is used as the battery 9 in the present embodiment. As the motor generator 2 is rotated by kinetic energy of the wheels 6 or driving force of the direct injection engine 1, electric power is generated. The thus generated electric power is converted into a direct current by the inverter 10 and used for charging the battery 9.

The hybrid control unit (hybrid vehicle control unit, which is hereinafter referred to as the HCU) 11, which is an embodiment of a vehicle control apparatus, starts and stops the system of the hybrid vehicle in accordance with a signal sent from an ignition key switch (not illustrated). Further, to supply necessary torque to the wheels 6 in accordance with an operation signal sent from a driver of the vehicle through an accelerator (not illustrated) or a brake (not illustrated), the HCU 11 outputs command signals to an engine control unit (ECU) 12, a motor control unit (MCU) 13, a battery control unit (BCU) 14, and a clutch control unit (CLCU) 15, which are connected through a LAN to the HCU 11.

Figure 2:
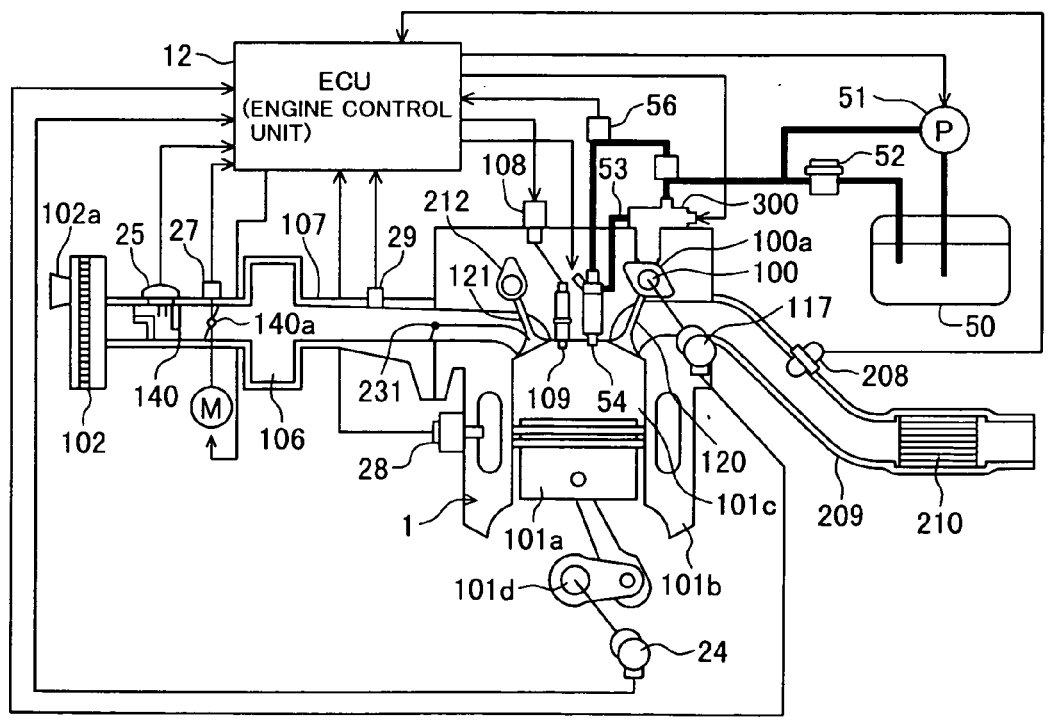
FIG. 2 is a diagram illustrating a configuration of a control system of a direct injection engine according to an embodiment of the present invention.

With reference to FIG. 2, the direct injection engine 1 will now be described in detail.

The direct injection engine 1 includes four cylinders (not illustrated). In accordance with an engine start request sent by the HCU 11, the motor generator 2 rotates a crank shaft 101d of the direct injection engine 1.

In the direct injection engine 1, each of the cylinders includes a combustion chamber 101c having a cylinder block 101b, a piston 101a, and the like.

Air introduced into the individual combustion chamber 101c is taken in from an inlet 102a of an air cleaner 102, conveyed to a collector 106 through an intake air-flow sensor 25 and a throttle body 140 which includes an electrically controlled throttle valve (an electrically controlled throttle valve device) 140a for controlling an intake air-flow amount. The air brought into the collector 106 is distributed to an intake pipe (an intake port) 107 connected to the individual combustion chamber 101c and then introduced into the combustion chamber 101c. The intake pipe 107 is provided with an intake pipe inner pressure sensor 29.

The intake air-flow sensor 25 outputs a signal representing the intake air-flow amount to the ECU 12. The throttle body 140 is provided with a throttle sensor 27 for detecting an opening degree of the electrically controlled throttle valve 140a. A signal output by the throttle sensor 27 is also sent to the ECU 12.

The intake pipe 107 includes a tumble control valve 231 which generates an air-flow called a tumble flow in the combustion chamber 101c and collects a combustible air-fuel mixture near an ignition plug (an ignition device) 109. Methods of collecting the combustible air-fuel mixture near the ignition plug 109 include a swirl flow method using a swirl flow, a wall guide method using a recess of a piston head, and a right-upward injection method of injecting fuel from a fuel injection valve 54 toward the vicinity of the ignition plug 109, for example. In the present invention, the method of collecting the combustible air-fuel mixture near the ignition plug 109 is not limited to the ones described above.

Fuel such as gasoline is conveyed from a fuel tank 50 and is subjected to a first pressurization by a fuel pump (a low-pressure fuel pump) 51. Then, the pressure of the fuel is adjusted to a certain pressure level (e.g., 3 kg/cm$^2$) by a fuel pressure regulator 52. Thereafter, the fuel is subjected to a second pressurization by a high-pressure fuel pump 300 to be adjusted to a higher pressure level (e.g., 50 kg/cm$^2$).

The fuel subjected to the second pressurization is injected through a common rail 53 into the combustion chamber 101c by the fuel injection valve (an injector) 54 provided to the combustion chamber 101c. A pipe for conveying the fuel subjected to the second pressurization is provided with a fuel pressure sensor 56.

The fuel injected into the combustion chamber 101c is ignited as the ignition plug 109 produces spark discharge in accordance with a high-voltage ignition signal generated by an ignition coil 108.

A crank angle sensor 24 provided to the crank shaft 101d of the direct injection engine 1 inputs a signal representing a rotation position of the crank shaft 101d to the ECU 12. Further, a cam angle sensor 117 provided to a cam shaft 100 of an exhaust valve 120 inputs an angle signal representing a rotation position of the cam shaft 100 to the ECU 12, and outputs an angle signal representing a rotation position of a pump drive cam 100a of the high-pressure fuel pump 300 to the ECU 12.

In the present embodiment, the cam-driven high-pressure fuel pump is used, for example, as a common system. However, the present invention is not limited to the use of the cam-driven high-pressure fuel pump. In particular, if the system using the apparatus of the present invention is a system of a hybrid vehicle equipped with a high-voltage battery, an electric pump may be used. In particular, if the electric pump is used, the pressure in the common rail 53 (i.e., fuel pressure) is not affected by a change in the number of engine revolutions (i.e., a change in motion of the cam shaft 100). Thus, the effect of the apparatus according to the present invention is improved.

An exhaust pipe 209 includes an air-fuel ratio sensor 208 which linearly detects, for example, oxygen density and outputs a detected signal to the ECU 12, and an exhaust gas clarifying catalyst 210.

The direct injection engine 1 is controlled by the ECU 12. The ECU 12 sends the electrically controlled throttle valve 140a commands concerning the number of engine revolutions of the direct injection engine 1 and a target throttle opening degree in accordance with a torque command sent by the HCU 11. Thereby, an air-flow amount is controlled.

The ECU 12 controls a fuel injection width (i.e., a fuel injection time) of the fuel injection valve 54 in accordance with a temperature of engine coolant water detected by a water temperature sensor (an engine water temperature sensor) 28, a detected signal of the air-fuel ratio sensor 208 provided in an exhaust system, and the like.

Air is taken into the combustion chamber 101c through an intake valve (a variable valve) 121, and the air-fuel mixture of the air and the fuel injected into the combustion chamber 101c by the fuel injection valve 54 is ignited by the ignition plug 109. Explosive energy generated by the combustion drives the piston 101a which drives the wheels 6 and the motor generator 2 via the output shaft 3 (refer to FIG. 1).

Figure 4:
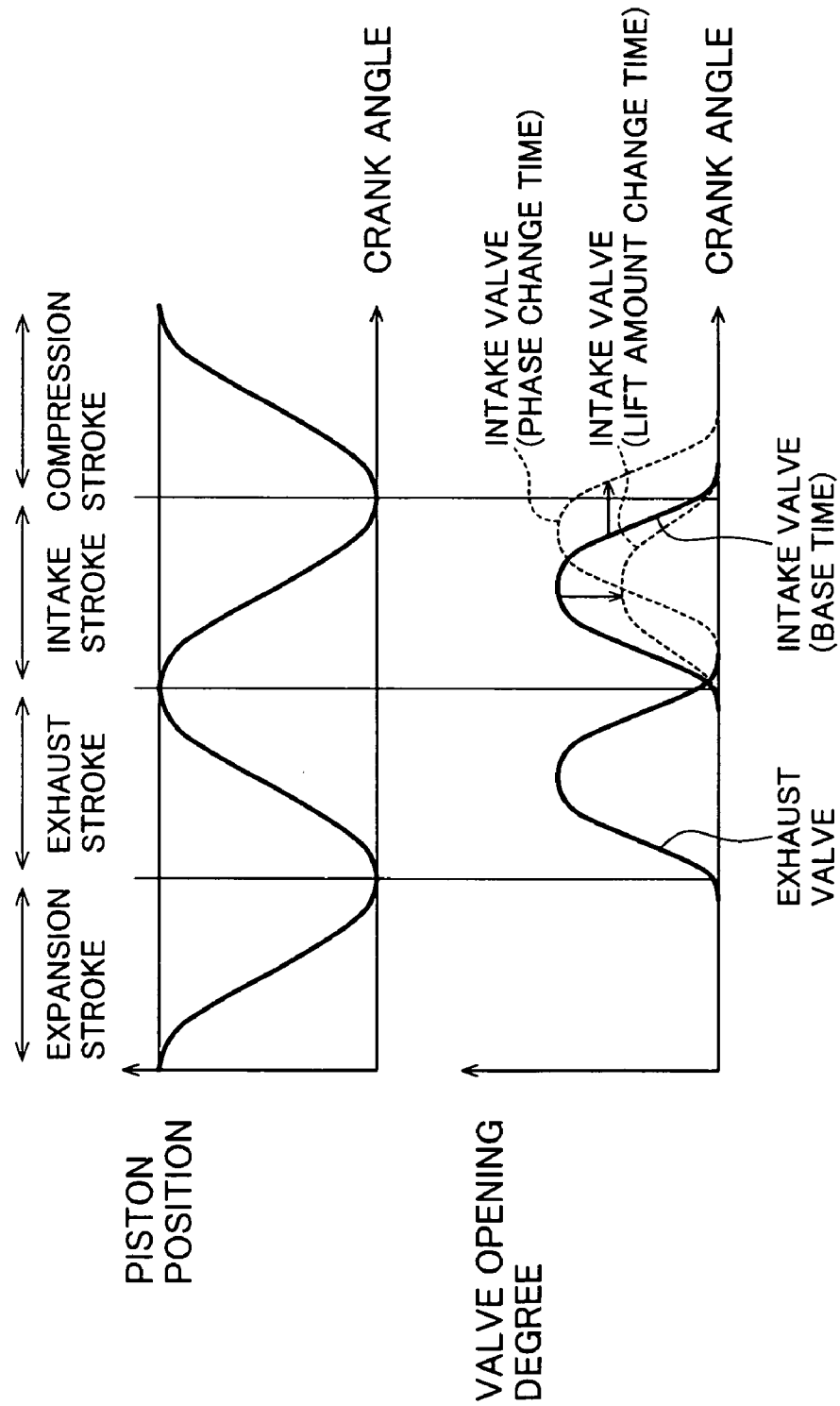
FIG. 4 is a graph representing characteristics of an intake valve opening characteristic adjusting device.

The intake valve 121 includes an intake valve opening characteristic adjusting device (a variable valve timing and lift mechanism) 212 having a later-described characteristic. As illustrated in FIG. 4, an actual compression ratio and the air-flow amount can be controlled by changing a lift amount and timing of opening and closing the intake valve 121 in accordance with a driving state.

Figure 3:
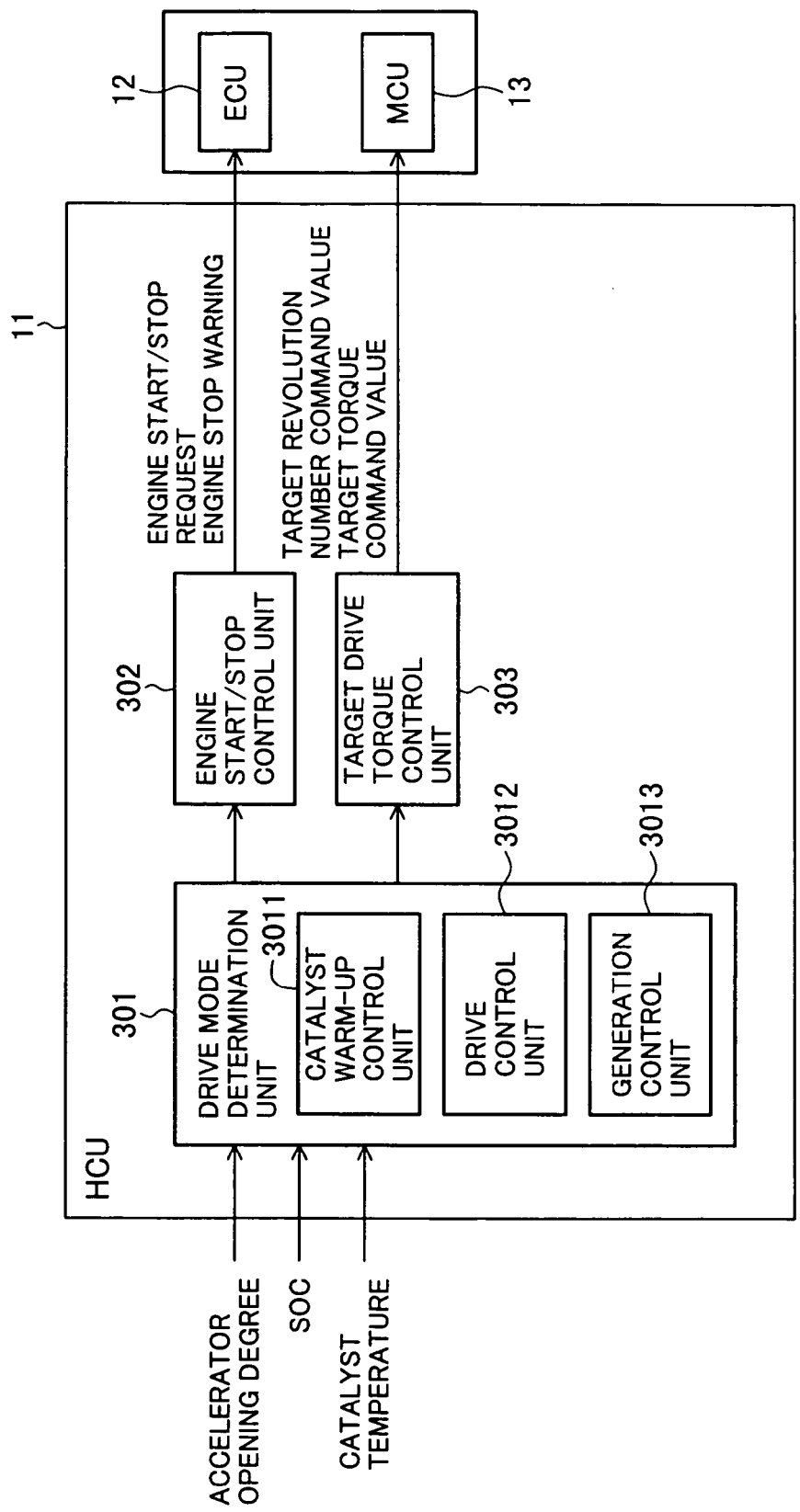
FIG. 3 is a control block diagram of a control apparatus of a direct injection engine according to an embodiment of the present invention.

With reference to FIG. 3, the HCU 11 will now be described.

The HCU 11 includes a drive mode determination unit 301, an engine start/stop control unit 302, and a target drive torque control unit 303.

The HCU 11 receives input of an accelerator opening degree commanded by the driver, an SOC value indicating a charge state of the battery 9, a catalyst temperature indicating an activation state of the exhaust gas clarifying catalyst 210, and the like, and determines a drive mode at the drive mode determination unit 301.

The drive mode determination unit 301 includes a catalyst warm-up control unit 3011 which prohibits the engine stop, when the temperature of the exhaust gas clarifying catalyst 210 is low, so that activation of the exhaust gas clarifying catalyst 210 is promoted. The drive mode determination unit 301 further includes a drive control unit 3012 which calculates a driver-requested torque on the basis of the accelerator opening degree commanded by the driver, and a generation control unit 3013 which determines whether power generation can be performed on the basis of the charge state of the battery 9.

A control operation for starting the direct injection engine 1 will now be described.

When the drive mode determination unit 301 determines that the direct injection engine 1 needs to be started, the engine start/stop control unit 302 sends the MCU 13 the engine start request. The MCU 13 drives the motor generator 2 in accordance with a received command value, and rotates the output shaft 3 via the power transmitting belt mechanism 8. Thereby, the direct injection engine 1 is started. The control operation for starting the direct injection engine 1 is later described in detail.

The target drive torque control unit 303 determines distribution of torque to the direct injection engine 1 and the motor generator 2 on the basis of the driver-requested torque calculated by the drive control unit 3012 and a generated torque calculated by the generation control unit 3013. Then, the target drive torque control unit 303 sends commands to the ECU 12 and the MCU 13 in the form of a target revolution number command value and a target torque command value.

A control operation for stopping the direct injection engine 1 will now be described.

Figure 8:
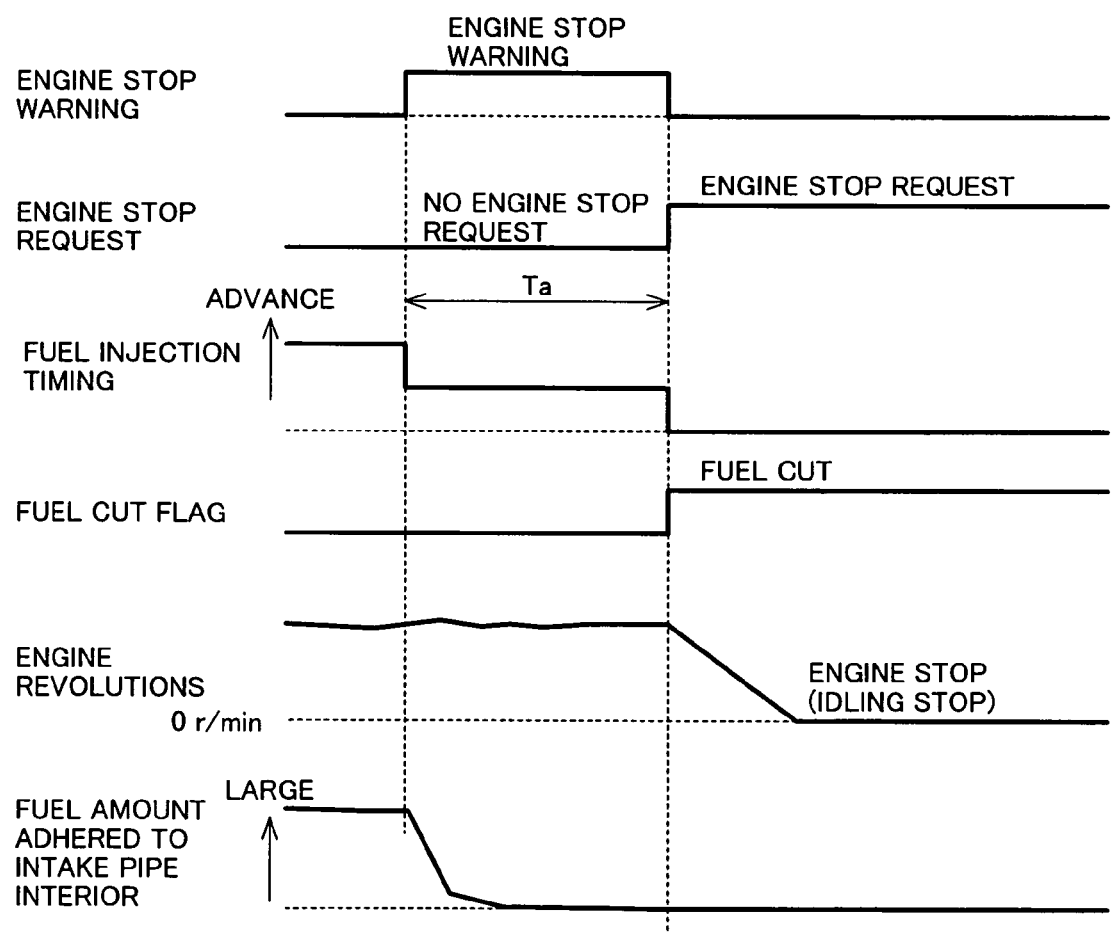
FIG. 8 is a timing chart representing timings of operations according to an embodiment of the present invention using a fuel injection timing.

When the drive mode determination unit 301 determines that the exhaust gas clarifying catalyst 210 has been activated, that the SOC value of the battery 9 is high, and that the driver-requested torque is small, then the engine start/stop control unit 302 sends the ECU 12 a command warning engine stop, as illustrated in FIG. 8. Thereafter, the engine start/stop control unit 302 sends a command requesting the engine stop. In accordance with the engine stop request, the ECU 12 prohibits fuel injection (i.e., fuel cut), so that the direct injection engine 1 is stopped.

As described above, one major characteristic of the hybrid vehicle and the idling stop vehicle is that the timing of stopping the direct injection engine 1 can be arbitrarily determined by the control unit not by the will of the driver.

Figure 5:
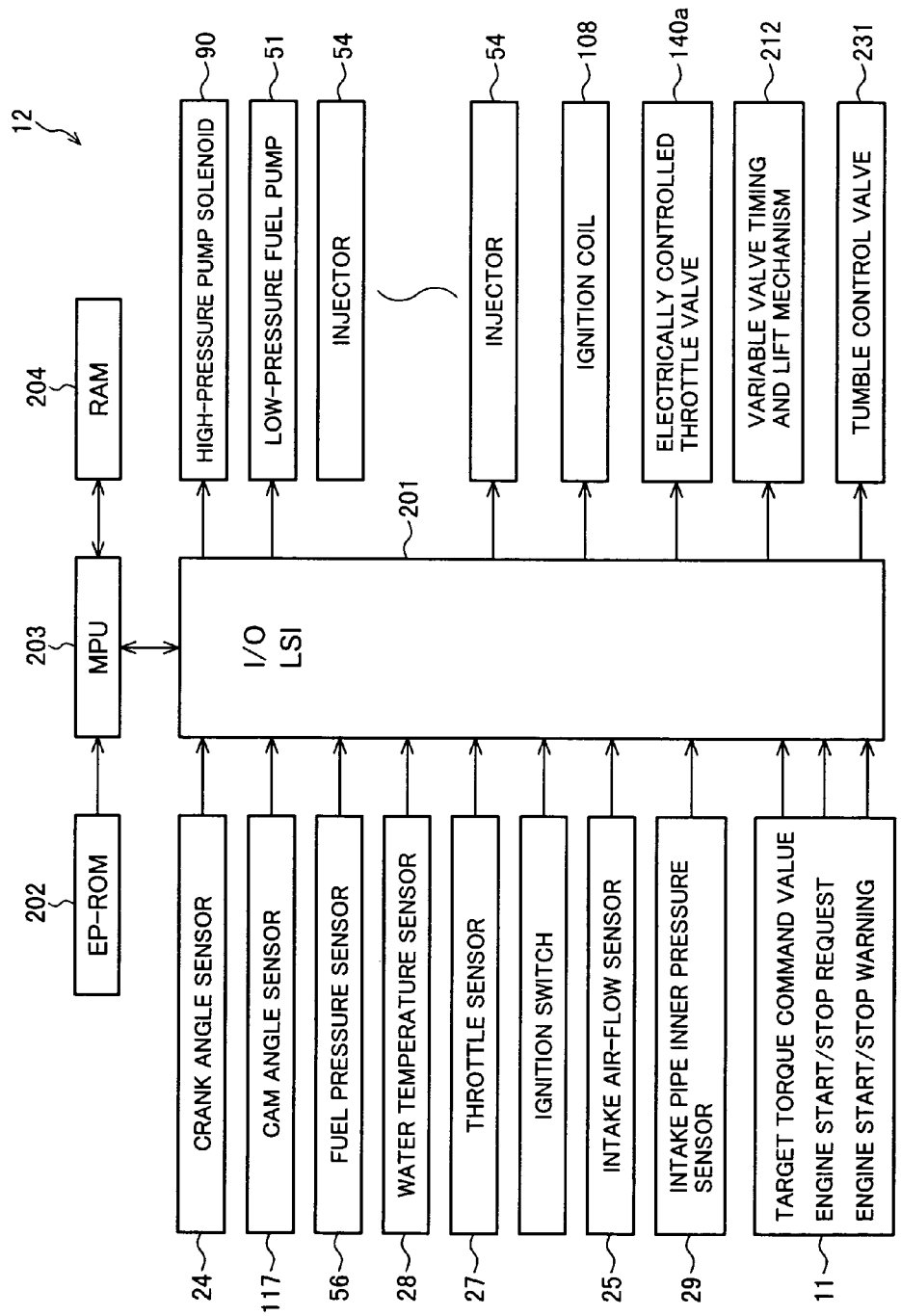
FIG. 5 is a diagram illustrating an I/O of the engine control apparatus.

With reference to FIG. 5, a configuration example of the ECU 12 will now be described.

The ECU 12 includes an MPU 203, an EP-ROM 202, RAM 204, and an I/O LSI 201 including an A/D converter.

When the engine starts, in accordance with the engine start/stop request and the target torque command value, which are the commands sent by the HCU 11, the motor generator 2 directly connected to the crank shaft 101d rotates, and the direct injection engine 1 rotates. The ECU 12 receives input of signals sent by a variety of sensors including the crank angle sensor 24, the cam angle sensor 117, the water temperature sensor 28 for measuring the temperature of the engine coolant water, the intake pipe inner pressure sensor 29 for measuring the pressure in the intake pipe 107, and the fuel pressure sensor 56. Then, the ECU 12 performs predetermined arithmetic processing and outputs a variety of control signals obtained as a result of the arithmetic processing. Further, the ECU 12 supplies predetermined control signals to a high-pressure pump solenoid 90 which serves as an actuator, the fuel injection valve (injector) 54, the ignition coil 108, the electrically controlled throttle valve 140a, the intake valve opening characteristic adjusting device 212, the tumble control valve 231, and so forth. Thereby, the ECU 12 controls a discharged fuel amount, an injected fuel amount, the intake air-flow amount, an ignition timing, and the like.

Meanwhile, an engine stop operation is carried out as the ECU 12 controls to prohibit the fuel injection in accordance with the engine start/stop request which is a command sent by the HCU 11.

Figure 6:
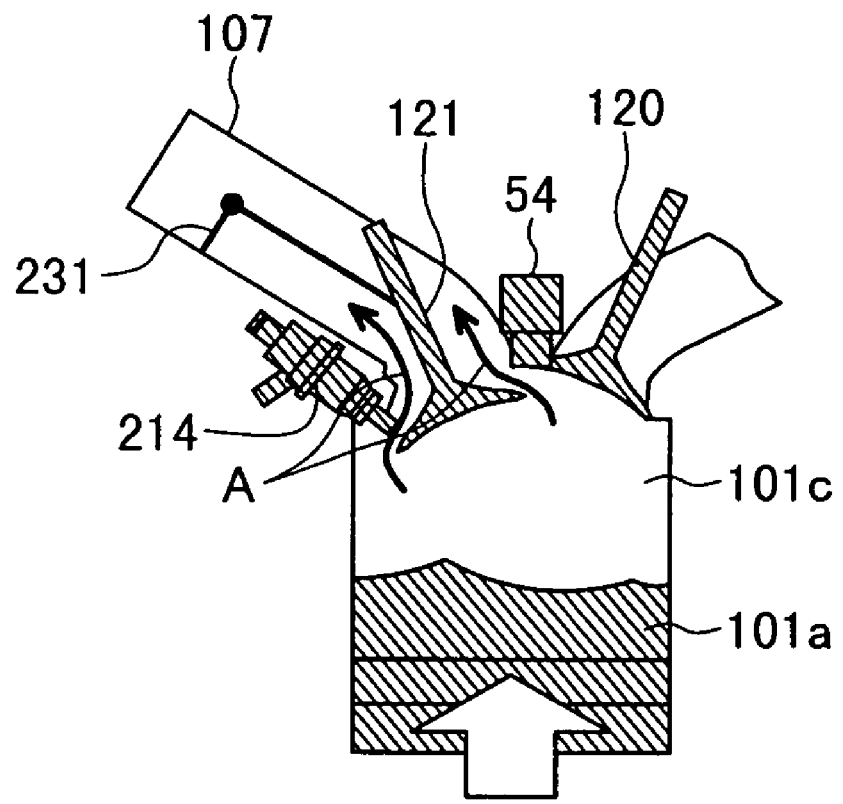
FIG. 6 is a diagram illustrating a backflow of fuel occurring during a compression stroke.
Figure 7:
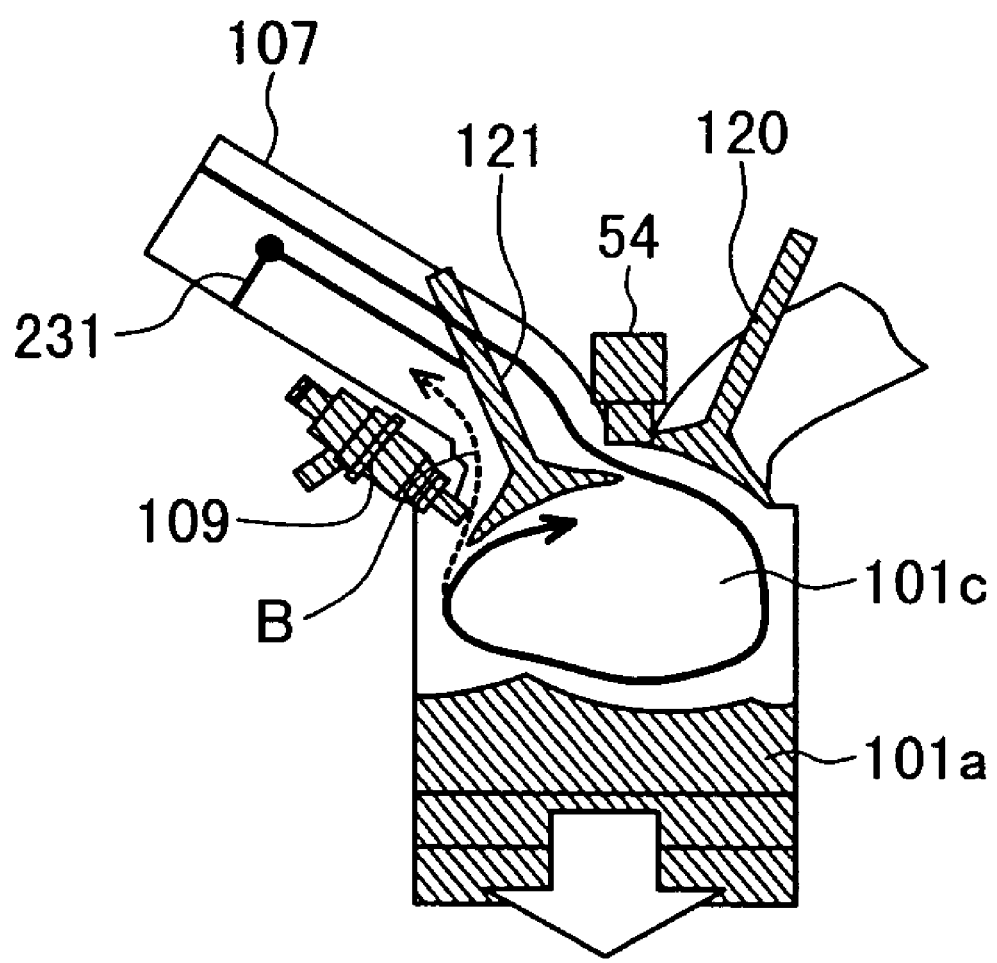
FIG. 7 is a diagram illustrating a backflow of fuel occurring during an intake stroke.

With reference to FIGS. 6 and 7, description will now be made of the backflow of fuel occurring in the direct injection engine 1, which is the issue addressed by the present invention. FIG. 6 illustrates a state of fuel injected by the fuel injection valve 54 during an intake stroke and stays in the combustion chamber 101c during a compression stroke.

As illustrated in FIG. 4, there is an open space around the intake valve 121 during the compression stroke. Therefore, as indicated by arrows A shown in FIG. 6, the injected fuel flows back to the intake pipe 107.

Further, as indicated by an arrow B shown in FIG. 7, the injected fuel flows back to the intake pipe 107 during the intake stroke, too, due to the air-flow in the combustion chamber 101c. As described above, particularly in the system which actively produces the air-flow in the combustion chamber 101c with the tumble control valve 231 or the like, the amount of the fuel backflow increases.

The thus flowed back fuel flows into the combustion chamber 101c in subsequent operation cycles while the direct injection engine 1 is in operation. Therefore, there is no problem during a combustion operation of the direct injection engine 1 (i.e., balance is maintained due to combustion of the flowed back fuel). When the direct injection engine 1 is stopped, however, the flowed back fuel remains in the intake pipe 107 of the direct injection engine 1.

In accordance with the above description, embodiments of the engine control apparatus according to the present invention will now be described.

(Embodiment Controlling the Fuel Injection Timing)

Figure 9:
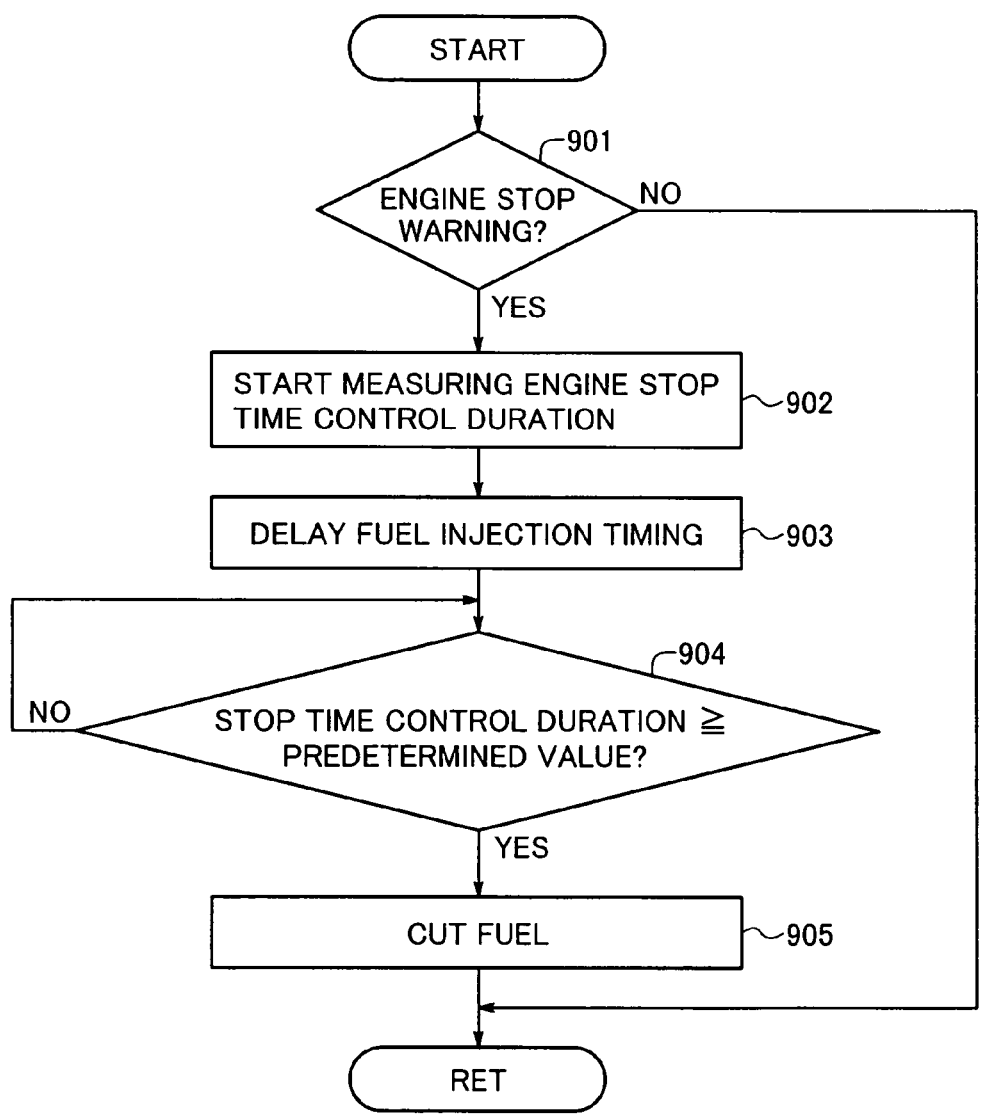
FIG. 9 is a flowchart illustrating the operations according to the embodiment of the present invention using the fuel injection timing.

With reference to FIGS. 8 and 9, description will be made of a method of reducing the residual fuel in the engine stop time by controlling the fuel injection timing.

As illustrated in FIG. 8, upon receipt of the "engine stop warning" sent by the HCU 11 at the time of engine stop, the ECU 12 delays the fuel injection timing for a predetermined time period Ta and thereafter cuts fuel supply from the fuel injection valve 54. Thereby, the direct injection engine 1 is stopped.

A time period by which the fuel injection timing is delayed is preferably set so as not to cause the backflow of fuel. For example, if the fuel injection starts when the intake valve 121 closes in the compression stroke or when the intake valve 121 closes prior to the fuel backflow to the intake pipe 107, the fuel does not flow back to the intake pipe 107. Accordingly, the amount of the fuel adhered to the interior of the intake pipe 107 is reduced.

Due to the delay of the fuel injection timing, however, the space in the combustion chamber 101c increasingly becomes into a stratified state. As a result, a torque step may occur in some direct injection systems. Therefore, unlike the illustration shown in the present chart of FIG. 8, the fuel injection timing may not be delayed stepwise but may be delayed gradually. Further, in a system having a power source other than the direct injection engine 1, as in the present embodiment, the torque step occurring when shifting the fuel injection timing may be corrected by using the power source.

A time period for which the present control operation continues to be performed (i.e., a predetermined time period) is equal to a time period for which the direct injection engine 1 continues to be stopped. As described above, in the idling stop vehicle, the idling stop timing can be arbitrarily determined by the HCU 11 not by the will of the driver. The predetermined time period is preferably set to continue at least until the time when each of the cylinders goes through one operation cycle. If the amount of the fuel backflow varies depending on such factors as the number of engine revolutions, a load, and a water temperature, the predetermined time period may be changed in accordance with the above factors. Further, if the ignition switch-off operation is performed by the driver, the direct injection engine 1 needs to be stopped as soon as possible. In this case, therefore, the present control operation may not be performed.

FIG. 9 is a flowchart illustrating the present operation of controlling the fuel injection timing.

It is first determined whether the engine stop warning sent by the HCU 11 is received (Step S901). If it is determined that the engine stop warning is not received (NO in Step S901), i.e., if it is determined that there is no request for the idling stop, this routine ends.

Meanwhile, if it is determined that the engine stop warning is received (YES in Step S901), measurement of a duration for which the control operation for the engine stop state is performed (hereinafter referred to as an engine stop time control duration) starts (Step S902).

Then, the operation of delaying the fuel injection timing starts (Step S903). Thereafter, it is determined whether the engine stop time control duration amounts to the predetermined time period (Step S904). If it is determined that the engine stop time control duration does not amount to the predetermined time period (NO in Step S904), the operation of delaying the fuel injection timing continues.

If it is determined that the engine stop time control duration amounts to the predetermined time period (YES in Step S904), the fuel supplied by the fuel injection valve 54 is cut (Step S905). Accordingly, the direct injection engine 1 is stopped.

(Embodiment Controlling the Fuel Injection Pulse Width and the Air-flow Amount)

Figure 10:
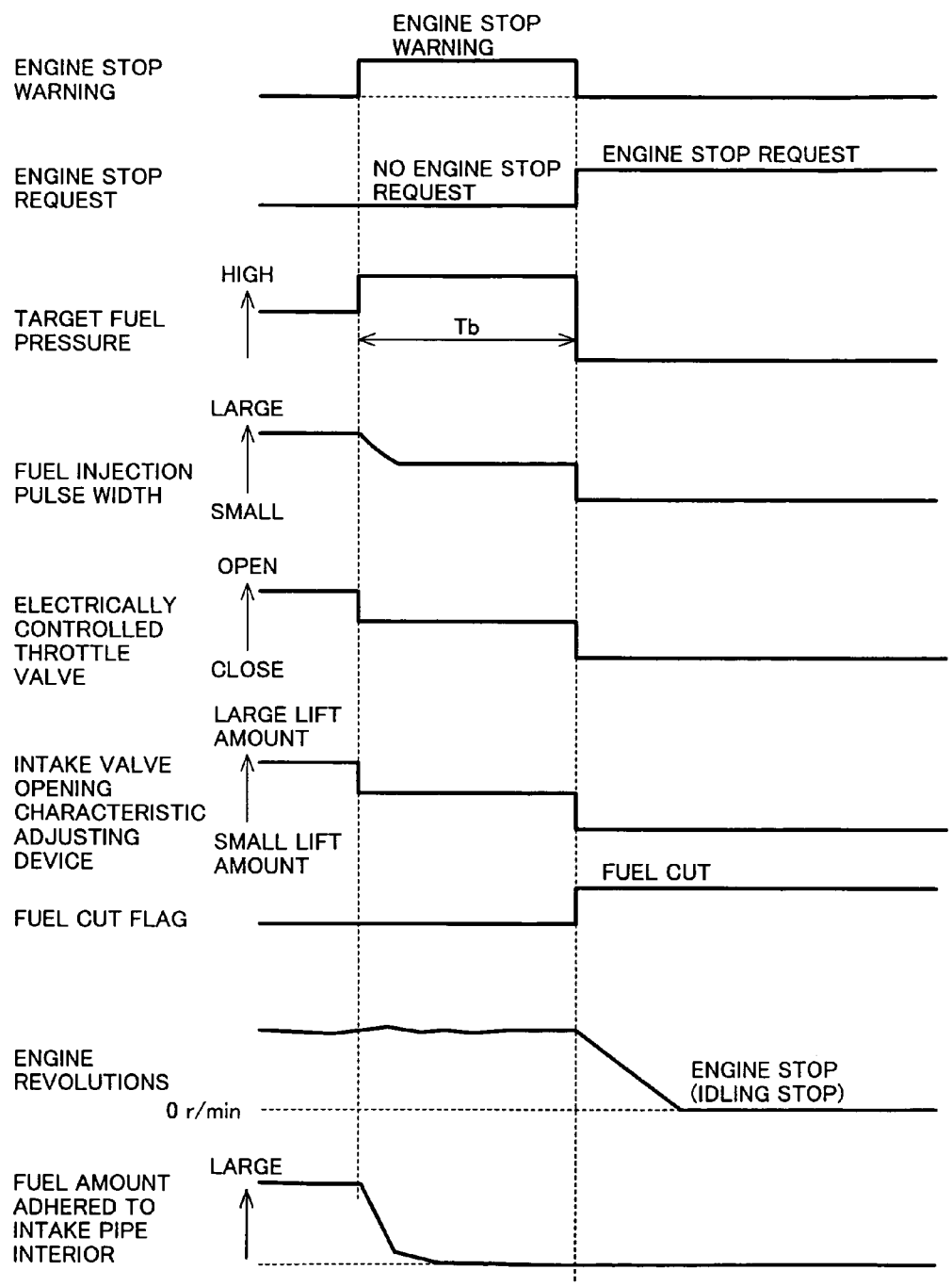
FIG. 10 is a timing chart representing timings of operations according to an embodiment of the present invention using a fuel injection pulse width and air-flow amount control.
Figure 11:
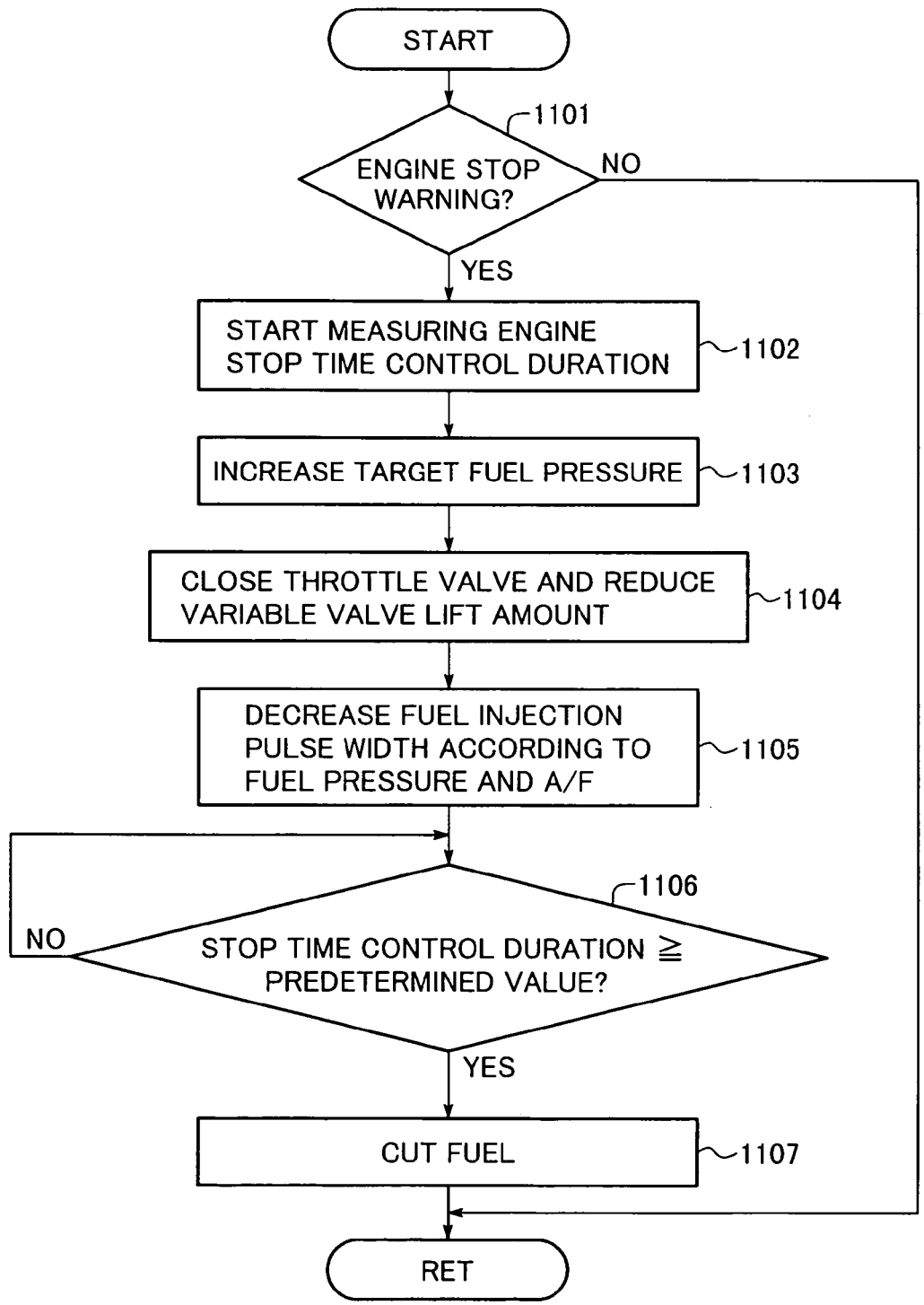
FIG. 11 is a flowchart illustrating the operations according to the embodiment of the present invention using the fuel injection pulse width and the air-flow amount control.

With reference to FIGS. 10 and 11, description will be made of a method of reducing the residual fuel in the engine stop time by controlling the fuel injection pulse width and the air-flow amount.

As illustrated in FIG. 10, upon receipt of the "engine stop warning" sent by the HCU 11 at the time of engine stop, the ECU 12 decreases the fuel injection pulse width for a predetermined time period Tb and reduces the amount of fuel injected by the fuel injection valve 54. Thereafter, the fuel supply by the fuel injection valve 54 is cut. Thereby, the direct injection engine 1 is stopped.

The fuel injection pulse width is preferably set in accordance with the timing of closing the intake valve 121 so as not to cause the backflow of fuel. Accordingly, the amount of the fuel adhered to the interior of the intake pipe 107 is reduced.

However, the reduction in the amount of injected fuel changes the A/F value in the combustion chamber 101c. This may lead to the deterioration of exhaust performance. In view of this, the electrically controlled throttle valve 140a is closed to maintain the A/F value. More preferably, the lift amount of the intake valve opening characteristic adjusting device 212 is reduced to reduce the intake air-flow amount.

According to the present embodiment, as the fuel injection pulse width decreases, the engine torque is reduced. Since the torque requested for the direct injection engine 1 is small in the engine stop time, the system can be operated without problems.

If the pressure in the common rail 53 (i.e., fuel pressure) is increased, the fuel injection pulse width can be decreased, with the fuel amount unchanged. Therefore, as another method of decreasing the fuel injection pulse width, the fuel pressure may be controlled to be a high pressure value by the high-pressure fuel pump 300.

A time period for which the present control operation continues to be performed (i.e., a predetermined time period) is equal to the time period for which the direct injection engine 1 continues to be stopped. As described above, in the idling stop vehicle, the idling stop timing can be arbitrarily determined by the HCU 11 not by the will of the driver. The predetermined time period is preferably set to continue at least until the time when each of the cylinders goes through one operation cycle. If the amount of the fuel backflow varies depending on such factors as the number of engine revolutions, the load, and the water temperature, the predetermined time period may be changed in accordance with the above factors. Further, if the ignition switch-off operation is performed by the driver, the direct injection engine 1 needs to be stopped as soon as possible. In this case, therefore, the present control operation may not be performed.

FIG. 11 is a flowchart illustrating the present operation of controlling the fuel injection pulse width and the air-flow amount.

It is first determined whether the engine stop warning sent by the HCU 11 is received (Step S1101). If it is determined that the engine stop warning is not received (NO in Step S1101), i.e., if there is no request for the idling stop, this routine ends.

Meanwhile, if it is determined that the engine stop warning is received (YES in Step S1101), measurement of the engine stop time control duration starts (Step S1102).

Then, a target fuel pressure value is increased (Step S1103). Further, the electrically controlled throttle valve 140a is closed, and the lift amount of the intake valve 121 is reduced (Step S1104).

Then, the fuel injection pulse width is decreased in accordance with the fuel pressure and the A/F value (Step S1105). Thereafter, it is determined whether the engine stop time control duration amounts to the predetermined time period (Step S1106). If it is determined that the engine stop time control duration does not amount to the predetermined time period (NO in Step S1106), the operation of decreasing the fuel injection pulse width continues.

If it is determined that the engine stop time control duration amounts to the predetermined time period (YES in Step S1106), the fuel supplied by the fuel injection valve 54 is cut (Step S1107). Accordingly, the direct injection engine 1 is stopped.

(Embodiment Controlling an Intake Valve Actuation Timing)

Figure 12:
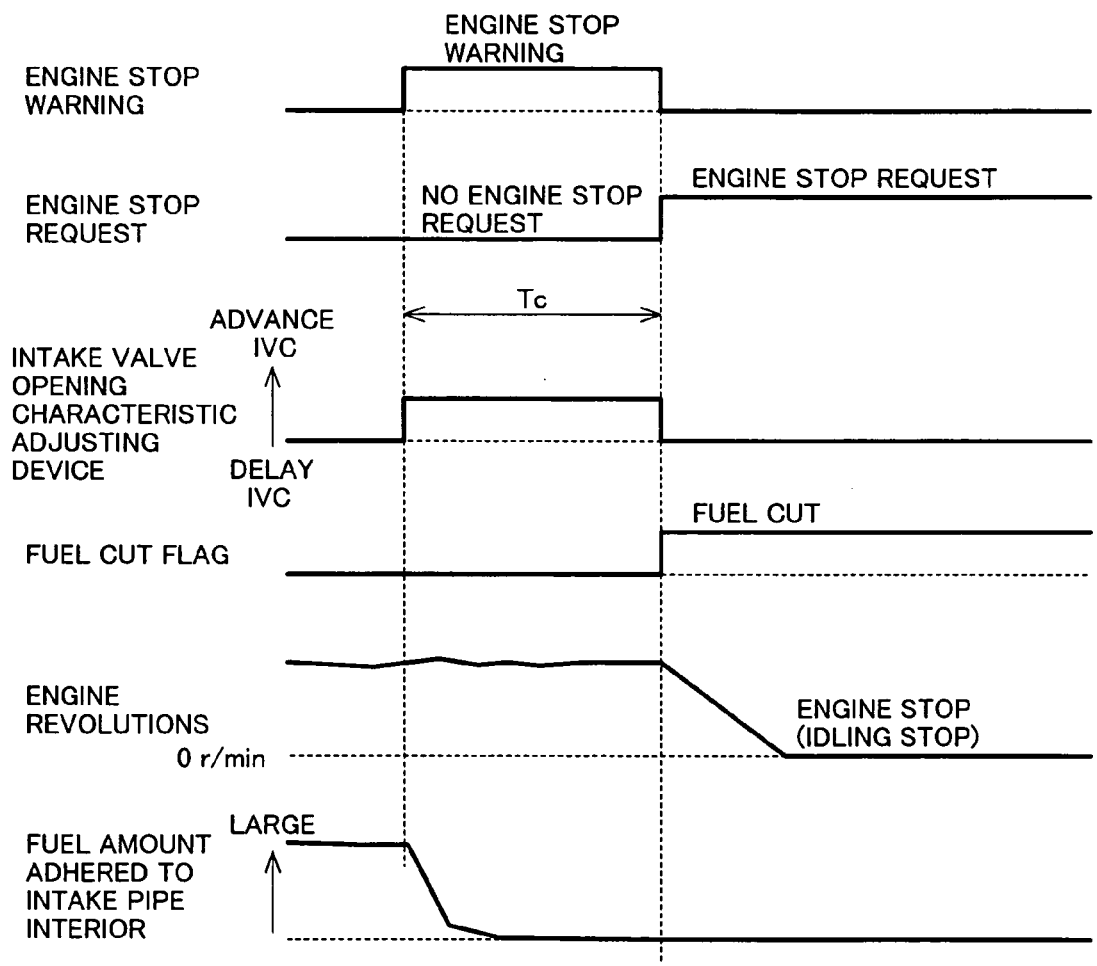
FIG. 12 is a timing chart representing timings of operations according to an embodiment of the present invention using an intake valve actuation timing.
Figure 13:
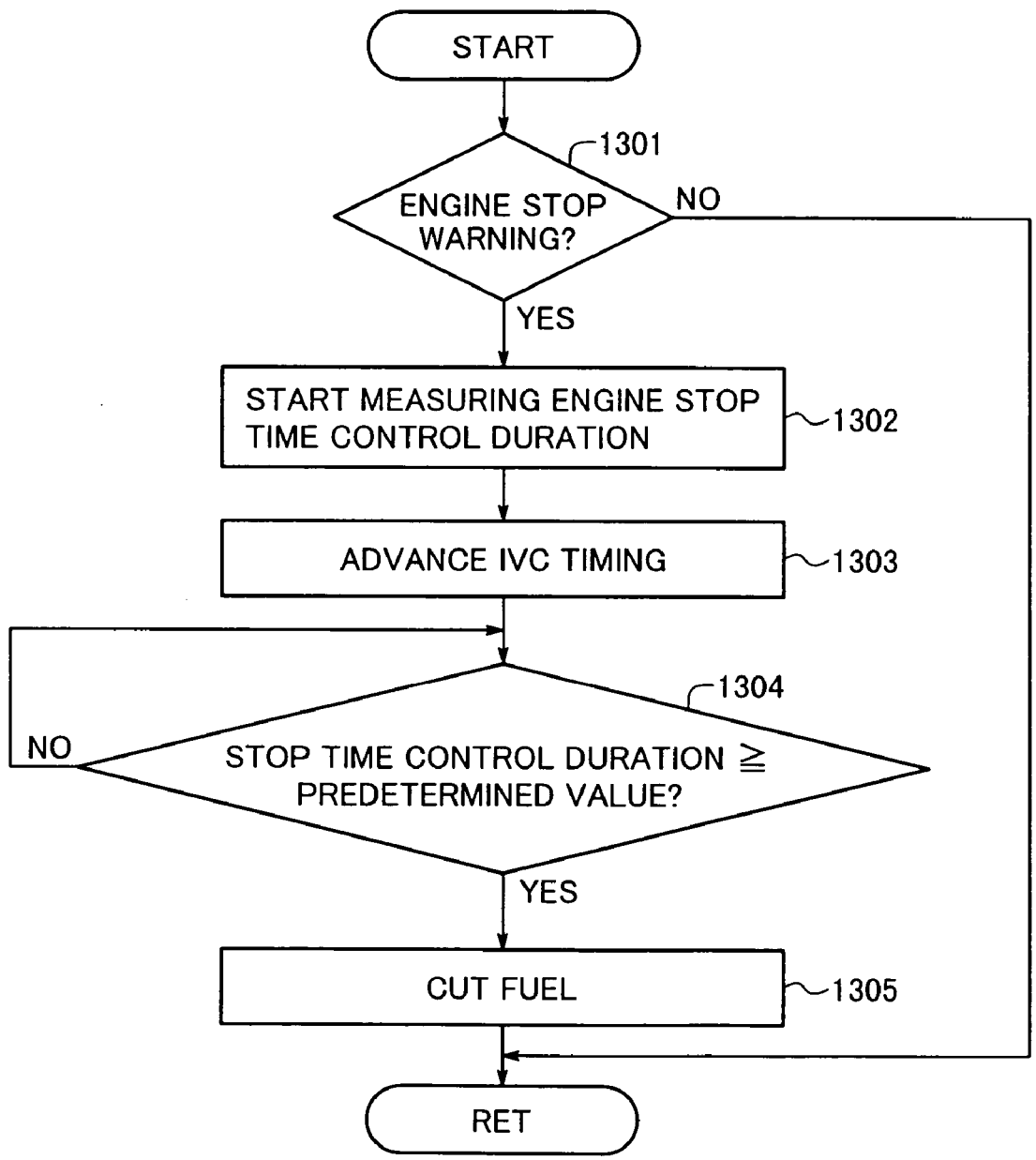
FIG. 13 is a flowchart illustrating the operations according to the embodiment of the present invention using the intake valve actuation timing.

With reference to FIGS. 12 and 13, description will be made of a method of reducing the residual fuel in the engine stop time by controlling the intake valve actuation timing through the intake valve opening characteristic adjusting device 212.

As illustrated in FIG. 12, upon receipt of the "engine stop warning" sent by the HCU 11 at the time of engine stop, the ECU 12 advances an intake valve closing timing (hereinafter referred to as an IVC timing) of the intake valve opening characteristic adjusting device 212 for a predetermined time period Tc. Thereafter, the fuel supply by the fuel injection valve 54 is cut. Thereby, the direct injection engine 1 is stopped.

The IVC timing is preferably set so as not to cause the backflow of fuel. For example, the IVC timing may be determined in accordance with the fuel injection pulse width or the like in each case. Further, by setting the IVC timing before bottom dead center (BBDC), the fuel flowing back in the compression stroke as illustrated in FIG. 6 can be reduced. Accordingly, the amount of the fuel adhered to the interior of the intake pipe 107 is reduced.

A time period for which the present control operation continues to be performed (i.e., a predetermined time period) is equal to the time period for which the direct injection engine 1 continues to be stopped. As described above, in the idling stop vehicle, the idling stop timing can be arbitrarily determined by the HCU 11 not by the will of the driver. The predetermined time period is preferably set to continue at least until the time when each of the cylinders goes through one operation cycle. If the amount of the fuel backflow varies depending on such factors as the number of engine revolutions, the load, and the water temperature, the predetermined-time period may be changed in accordance with the above factors. Further, if the ignition switch-off operation is performed by the driver, the direct injection engine 1 needs to be stopped as soon as possible. In this case, therefore, the present control operation may not be performed.

FIG. 13 is a flowchart illustrating the present operation of controlling the intake valve actuation timing.

It is first determined whether the engine stop warning sent by the HCU 11 is received (Step S1301). If it is determined that the engine stop warning is not received (NO in Step S1301), i.e., if there is no request for the idling stop, this routine ends.

Meanwhile, if it is determined that the engine stop warning is received (YES in Step S1301), measurement of the engine stop time control duration starts (Step S1302).

Then, the operation of advancing the intake valve actuation timing of the intake valve opening characteristic adjusting device 212 starts (Step S1303). Thereafter, it is determined whether the engine stop time control duration amounts to the predetermined time period (Step S1304). If it is determined that the engine stop time control duration does not amount to the predetermined time period (NO in Step S1304), the operation of advancing the intake valve actuation timing continues.

If it is determined that the engine stop time control duration amounts to the predetermined time period (YES in Step S1304), the fuel supplied by the fuel injection valve 54 is cut (Step S1305). Accordingly, the direct injection engine 1 is stopped.

Figure 14:
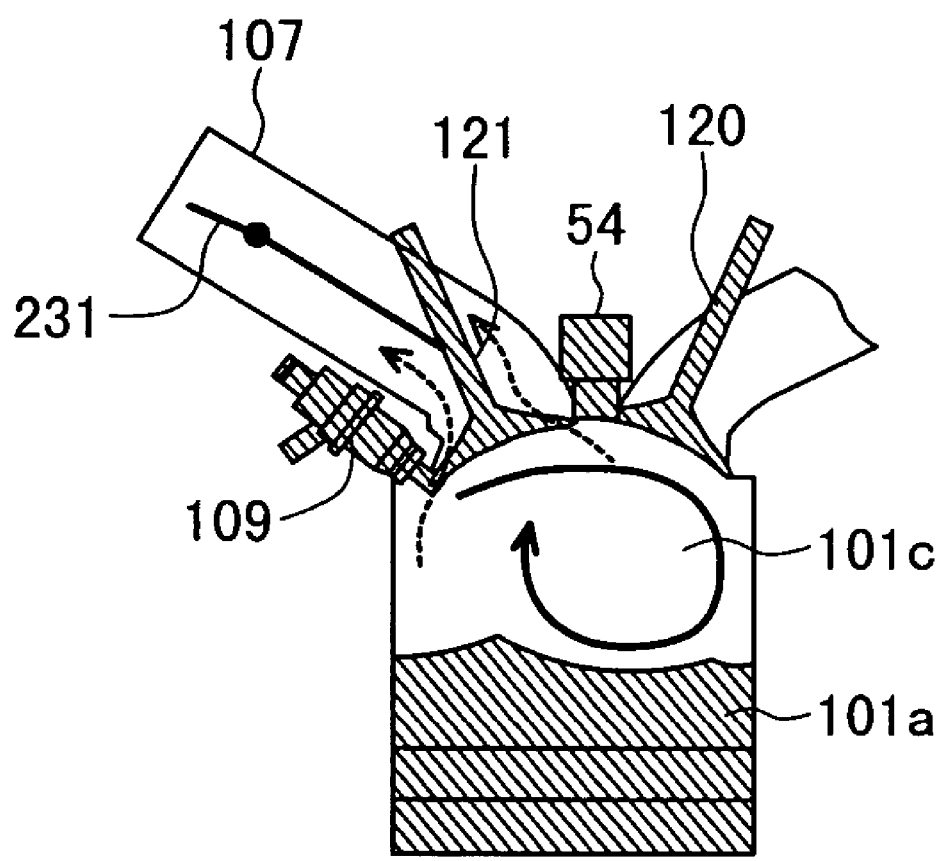
FIG. 14 is a diagram illustrating an effect of an apparatus according to an embodiment of the present invention against the backflow of fuel.

FIG. 14 illustrates a state in the combustion chamber 101c, when any one of the embodiments using the fuel injection timing, the fuel injection pulse width and the air-flow amount, and the intake valve actuation timing is used.

It is observed that, if the engine stop time control operation according to any of the above embodiments is performed, the injected fuel accumulates in the combustion chamber 101c and does not flow back to the intake pipe 107. Although not illustrated, particularly in the first one or two operation cycles immediately after the engine stop time control operation, the fuel flowed back to the intake pipe 107 flows into the combustion chamber 101c and thus may raise the A/F value. Therefore, after switching is made to the engine stop time control operation, such correction as reduction of the fuel injection amount may be performed.

(Embodiment Controlling the Air-flow)

With reference to FIGS. 15 to 18, description will be made of a method of reducing the residual fuel in the engine stop time by adjusting the air-flow using the tumble control valve 231.

As described above, in the direct injection engine 1 including the tumble control valve 231, the tumble flow is generated in the combustion chamber 101c, and the combustible air-fuel mixture is collected near the ignition coil 108.

Figure 17:
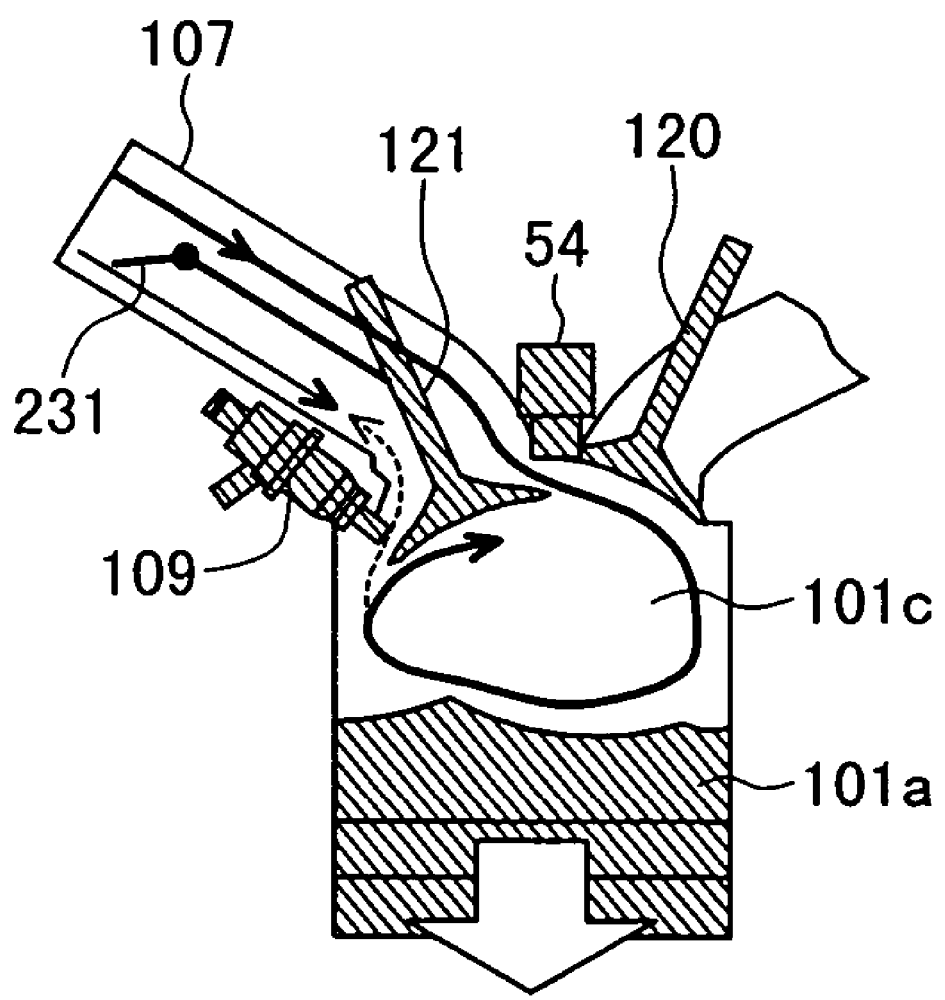
FIG. 17 is a diagram illustrating a combustion chamber when the air-flow adjusting device is in an ON state.
Figure 18:
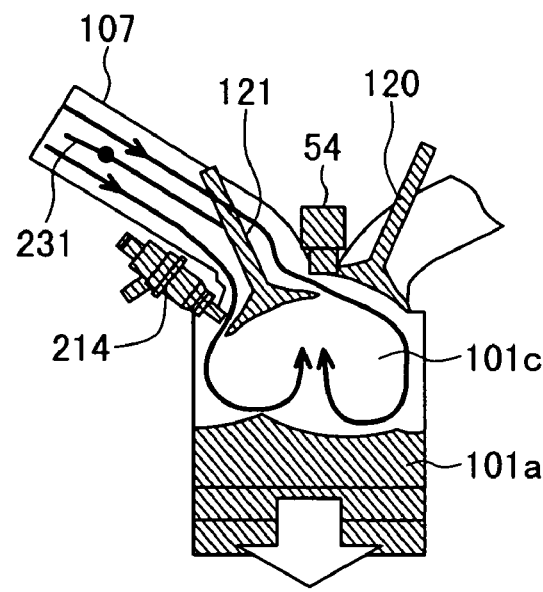
FIG. 18 is a diagram illustrating the combustion chamber when the air-flow adjusting device is in an OFF state.

FIG. 17 illustrates a state in the combustion chamber 101c in which the tumble flow is generated by the tumble control valve 231. As illustrated in FIG. 17, when the tumble flow is generated, the fuel flows back to the intake pipe 107 in the intake stroke in some cases.

Figure 15:
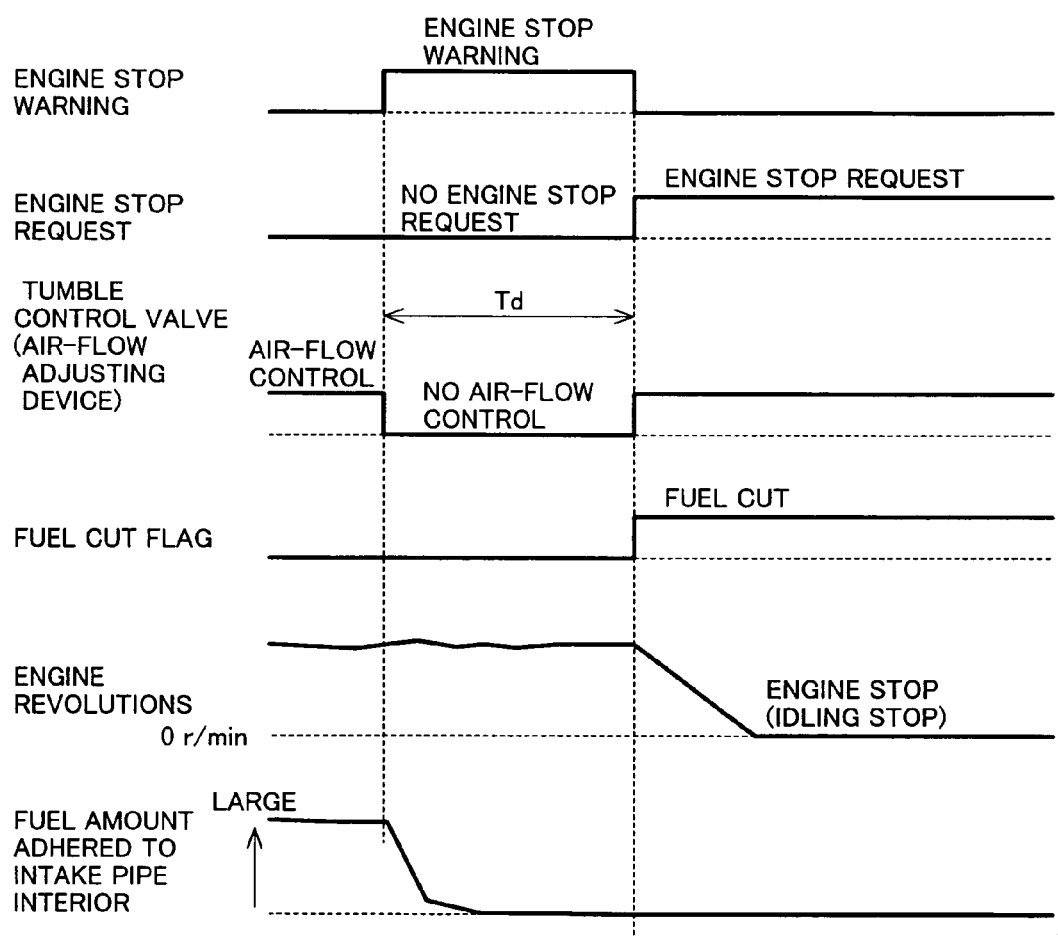
FIG. 15 is a timing chart representing timings of operations according to an embodiment of the present invention using an air-flow adjusting device.

Therefore, as illustrated in FIG. 15, upon receipt of the "engine stop warning" sent by the HCU 11 at the time of engine stop, the ECU 12 suppresses generation of the air-flow by the tumble control valve 231 for a predetermined time period Td. Thereby, the backflow of fuel to the intake pipe 107 can be suppressed (refer to FIG. 18). Accordingly, the amount of the fuel adhered to the interior of the intake pipe 107 is reduced.

A concept of a time period (i.e., a predetermined time period) in which the present control operation continues to be performed is similar to the concept described in the foregoing embodiments. Therefore, description of the predetermined time period is omitted.

Figure 16:
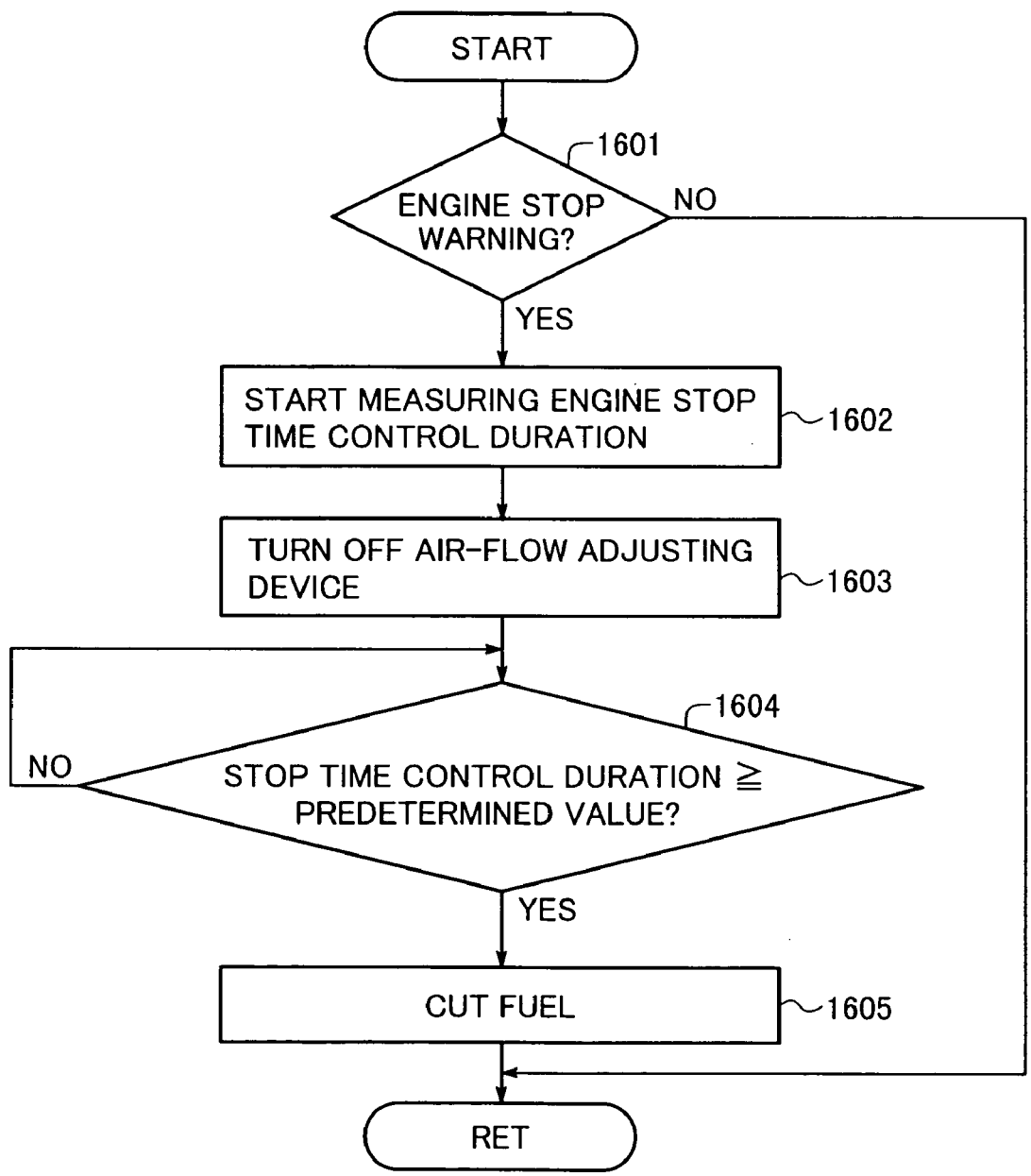
FIG. 16 is a flowchart illustrating the operations according to the embodiment of the present invention using the air-flow adjusting device.

FIG. 16 is a flowchart illustrating the present operation of controlling the air-flow.

It is first determined whether the engine stop warning sent by the HCU 11 is received (Step S1601). If it is determined that the engine stop warning is not received (NO in Step S1601), i.e., if there is no request for the idling stop, this routine ends.

Meanwhile, if it is determined that the engine stop warning is received (YES in Step S1601), measurement of the engine stop time control duration starts (Step S1602).

Then, the operation flow advances to Step S1603. The tumble control valve (an air-flow adjusting device) 231 is switched to an OFF state (i.e., the valve is opened) (Step S1603). Thereafter, it is determined whether the engine stop time control duration amounts to the predetermined time period (Step S1604). If it is determined that the engine stop time control duration does not amount to the predetermined time period (NO in Step S1604), the operation of switching the tumble control valve 231 to the OFF state continues.

If it is determined that the engine stop time control duration amounts to the predetermined time period (YES in Step S1604), the fuel supplied by the fuel injection valve 54 is cut (Step S1605). Accordingly, the direct injection engine 1 is stopped.

The embodiments described above are the methods of preventing the fuel flowed back to the intake pipe 107 from remaining in the intake pipe 107 in the engine stop time.

Description will now be made of a measure against the fuel adhered to the intake valve 121, the combustion chamber 101c, and the piston 101a so that the fuel is directly injected into the cylinder.

Figure 19:
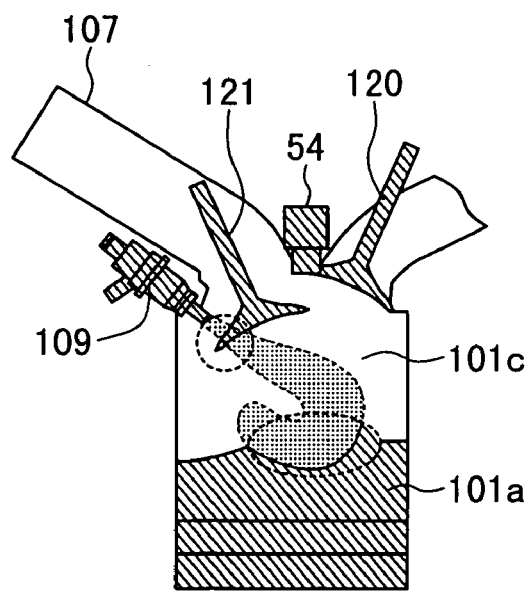
FIG. 19 is a diagram illustrating fuel adhesion.

FIG. 19 illustrates the direct injection engine 1 which directly injects fuel to the recess of a piston crown to collect the fuel near the ignition plug 109 by using the recessed shape. As is observed from FIG. 19, when the fuel is injected, the fuel is adhered to the crown surface of the piston 101a and the intake valve 121.

This adhesion of fuel can be prevented by facilitating fuel evaporation.

Methods of facilitating the fuel evaporation include (1) increasing the number of engine revolutions, (2) increasing the fuel pressure, and (3) increasing negative pressure in the intake pipe 107.

The third method can be performed by controlling the intake valve opening characteristic adjusting device 212 and the electrically controlled throttle valve 140a (i.e., reduction of the air-flow amount) at the time of engine stop. This method is similar to the method described above (i.e., the embodiment controlling the fuel injection pulse width and the air-flow amount).

Figure 20:
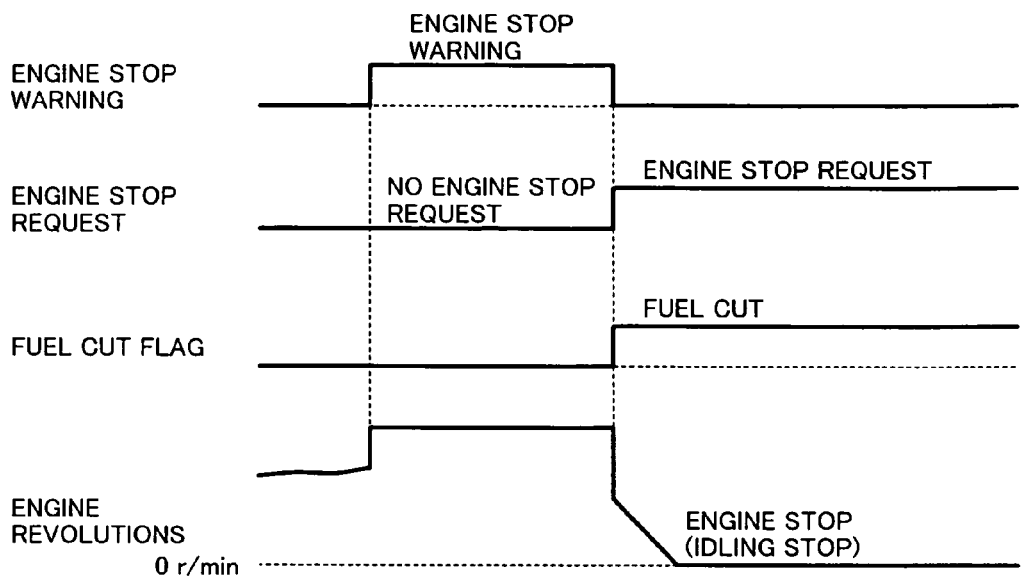
FIG. 20 is a timing chart representing timings of operations according to an embodiment of the present invention using the number of engine revolutions.

FIG. 20 is a timing chart representing timings of operations for increasing the number of engine revolutions in the engine stop time.

According to the present embodiment, at the time of engine stop, the HCU 11 sends the "engine stop warning" and the "number of engine revolutions" to the ECU 12 and the MCU 13, respectively. Thereby, the MCU 13 increases the number of engine revolutions to a predetermined value. Accordingly, the number of engine revolutions is increased. Then, a predetermined time period elapses, and the fuel supplied by the fuel injection valve 54 is cut. Thereby, the direct injection engine 1 is stopped.

Accordingly, the amount of the fuel adhered to the intake valve 121, the combustion chamber 101c, and the piston 101a is reduced.

A concept of a time period (i.e., a predetermined time period) in which the present control operation continues to be performed is similar to the concept described in the foregoing embodiments. Therefore, description of the predetermined time period is omitted.

Figure 21:
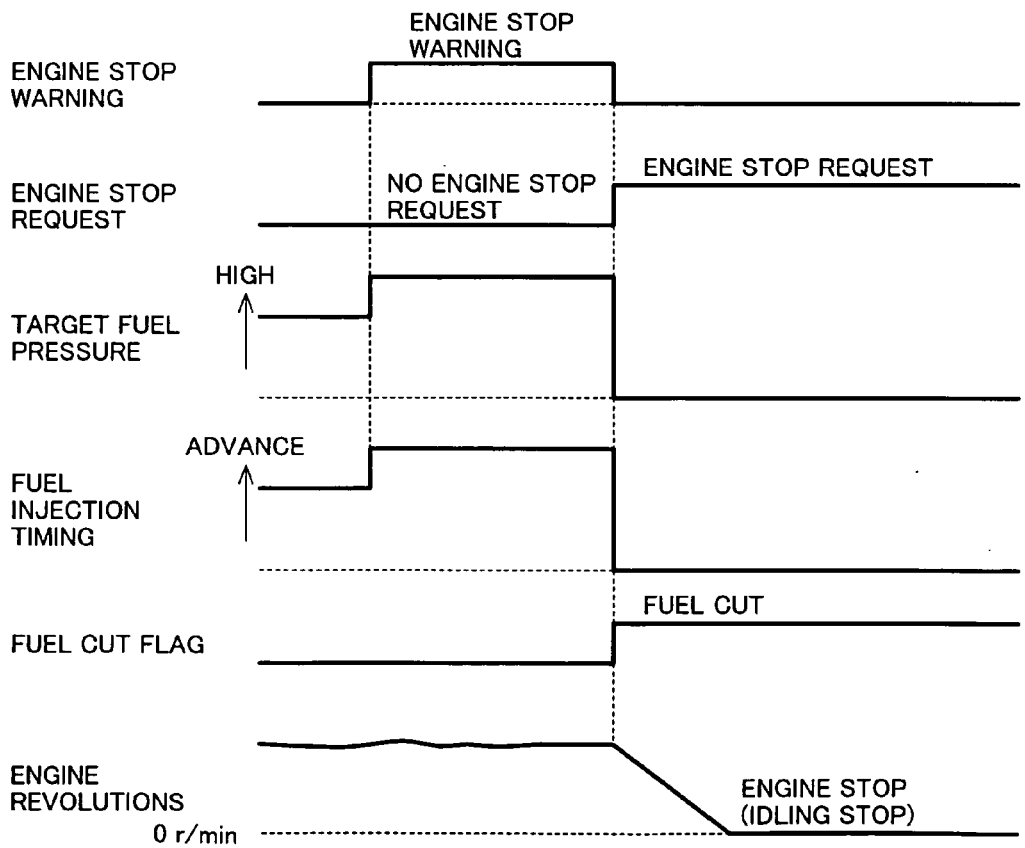
FIG. 21 is a timing chart representing timings of operations according to an embodiment of the present invention using fuel pressure.

FIG. 21 is a timing chart representing timings of operations for increasing the fuel pressure in the engine stop time.

According to the present embodiment, upon receipt of the "engine stop warning" sent by the HCU 11 at the time of engine stop, the ECU 12 increases the target fuel pressure for a predetermined time period, and the pressure in the common rail 53 (i.e., the fuel pressure of the fuel injected by the fuel injection valve 54) is increased by the high-pressure fuel pump 300. Further, as the fuel pressure increases, penetrating force of fuel increases. Therefore, by advancing the fuel injection timing at the same time, the fuel directly adhered to the crown surface of the piston 101a can be reduced.

A concept of a time period (i.e., a predetermined time period) in which the present control operation continues to be performed is similar to the concept described in the foregoing embodiments. Therefore, description of the predetermined time period is omitted.

Figure 22:
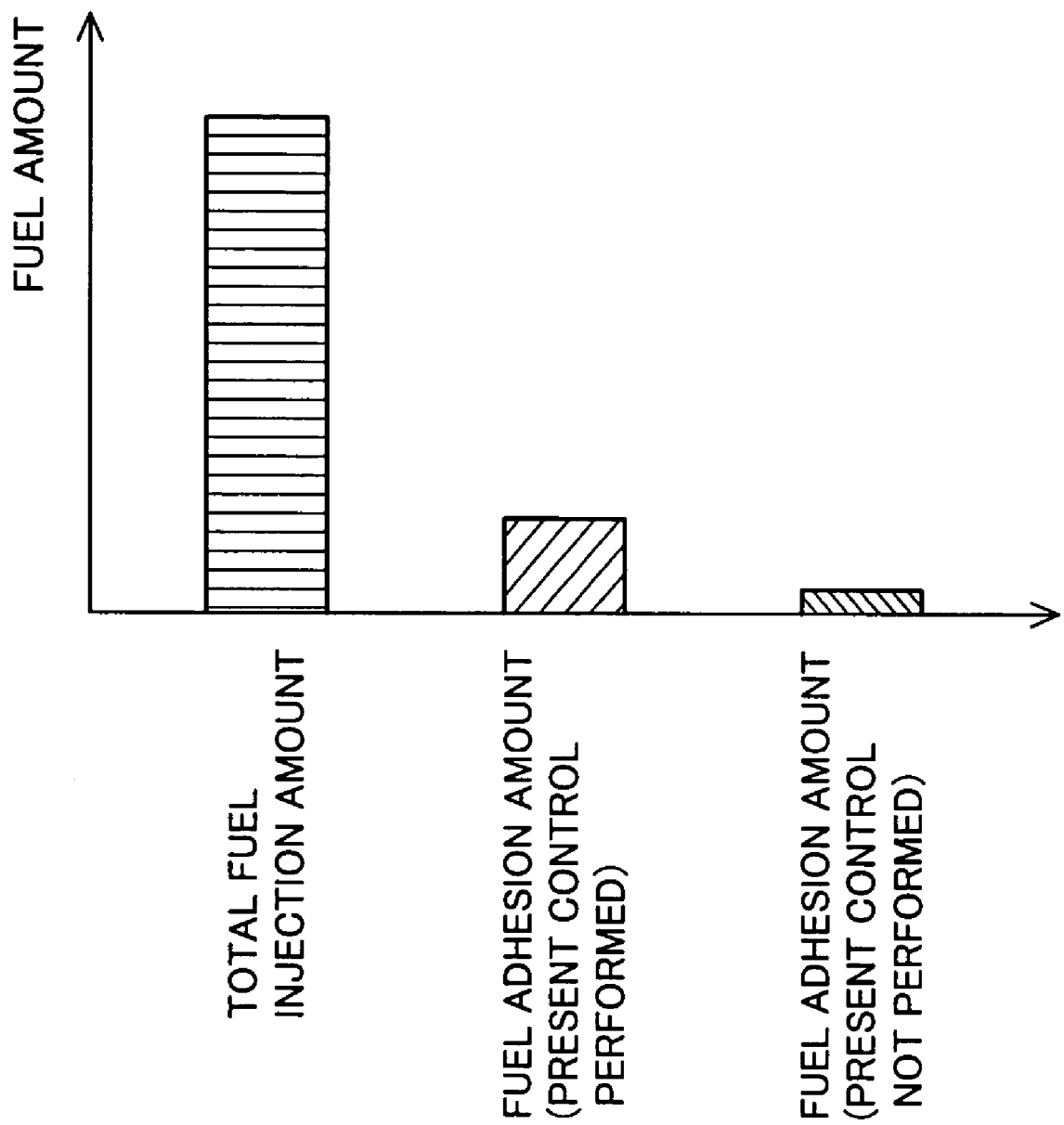
FIG. 22 is a graph representing an effect of an embodiment of the present invention against the fuel adhesion.

FIG. 22 represents an effect of the present embodiment against the adhered fuel. If the engine stop time control operation described in the present embodiment is used, the amount of the adhered fuel with respect to the total amount of the injected fuel can be reduced, compared with a case in which the engine stop time control operation according to the present embodiment is not used.

The embodiments described above are used in the hybrid vehicle. However, application of the present invention is not limited to the hybrid vehicle but applicable to any engine-automatic-stop direct injection engine system capable of stopping its engine irrespective of the will of the driver.

What is claimed is:

1. A control apparatus of a direct injection internal combustion engine, the control apparatus comprising:
    an automatic stop control device for automatically stopping an internal combustion engine upon satisfaction of a predetermined automatic stop condition; and
    at least one of
    a fuel injection control unit for correcting fuel injection, and
    an air-flow amount control unit for correcting an air-flow amount,
    wherein, upon satisfaction of the predetermined automatic stop condition, at least one of fuel injection correcting control by the fuel injection control unit and air-flow amount correcting control by the air-flow amount control unit is performed.

2. The control apparatus of a direct injection internal combustion engine according to claim 1,
    wherein, upon satisfaction of the predetermined automatic stop condition, the fuel injection control unit performs a fuel injection correcting control to delay a fuel injection timing for a predetermined time period, and thereafter the fuel injection control unit performs a fuel injection control to complete a fuel injection.

3. The control apparatus of a direct injection internal combustion engine according to claim 1,
    wherein, upon satisfaction of the predetermined automatic stop condition, the fuel injection control unit performs a fuel injection correcting control to reduce a fuel injection amount for a predetermined time period, and thereafter the fuel injection control unit performs a fuel injection control to complete a fuel injection.

4. The control apparatus of a direct injection internal combustion engine according to claim 3, wherein the fuel injection correcting control for reducing the fuel injection amount for the predetermined time period is performed by increasing pressure in a fuel common rail.

5. The control apparatus of a direct injection internal combustion engine according to claim 3,
wherein, during the predetermined time period in which the fuel injection control unit performs the fuel injection correcting control to reduce the fuel injection amount, the air-flow amount control unit performs a control to reduce an intake air-flow amount.

6. The control apparatus of a direct injection internal combustion engine according to claim 1,
wherein, upon satisfaction of the predetermined automatic stop condition, the air-flow amount control unit performs a control to advance an intake valve closing timing for a predetermined time period.

7. The control apparatus of a direct injection internal combustion engine according to claim 1,
wherein, upon satisfaction of the predetermined automatic stop condition, the air-flow amount control unit performs a control, for a predetermined time period, to stop operation of an air-flow adjusting device which adjusts an air-flow in a cylinder.

8. A control apparatus of a direct injection internal combustion engine, the control apparatus comprising:
an automatic stop control device for automatically stopping an internal combustion engine upon satisfaction of a predetermined automatic stop condition; and
at least one of
an air-flow amount control unit including an intake air-flow amount adjusting device for controlling to reduce an intake air-flow amount,
an engine revolution number control unit for increasing the number of engine revolutions for a predetermined time period at the end of a fuel injection,
a fuel pressure control unit for increasing fuel pressure to perform the fuel injection, and
a fuel injection control unit for correcting the fuel injection to advance a fuel injection timing,
wherein, upon satisfaction of the predetermined automatic stop condition, at least one of a control by the air-flow amount control unit to reduce the intake air-flow amount, a control by the engine revolution number control unit to increase the number of engine revolutions for the predetermined time period at the end of the fuel injection, and a control by the fuel pressure control unit and the fuel injection control unit to increase the fuel pressure for performing the fuel injection and then advance the fuel injection timing, is performed.

9. The control apparatus of a direct injection internal combustion engine according to claim 1,
wherein the air-flow amount control unit includes an electrically controlled throttle valve device provided to an intake passage.

10. The control apparatus of a direct injection internal combustion engine according to claim 1,
wherein the air-flow amount control unit includes an intake valve opening characteristic adjusting device provided to an intake passage.

11. The control apparatus according to claim 8, wherein the air-flow amount control unit includes an electrically controlled throttle valve device provided to an intake passage.

12. The control apparatus according to claim 8, wherein the air-flow amount control unit includes an intake valve opening characteristic adjusting device provided to an intake passage.

* * * * *